(12) United States Patent
Harada

(10) Patent No.: US 7,719,728 B2
(45) Date of Patent: May 18, 2010

(54) IMAGE READING DEVICE, IMAGE PROCESSING SYSTEM AND IMAGE FORMING DEVICE

(75) Inventor: Hiroyuki Harada, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1736 days.

(21) Appl. No.: 10/867,757

(22) Filed: Jun. 16, 2004

(65) Prior Publication Data

US 2005/0280880 A1    Dec. 22, 2005

(51) Int. Cl.
*H04N 1/04* (2006.01)
(52) U.S. Cl. ............... 358/475; 358/474; 358/461; 358/448
(58) Field of Classification Search .......... 358/475, 358/474, 461, 448
See application file for complete search history.

(56) References Cited

U.S. PATENT DOCUMENTS

| | | | | |
|---|---|---|---|---|
| 4,074,320 A | * | 2/1978 | Kapes, Jr. | 358/482 |
| 4,402,017 A | * | 8/1983 | Takei | 358/484 |
| 4,806,775 A | * | 2/1989 | Uchida | 358/494 |
| 5,625,470 A | * | 4/1997 | Ueta et al. | 358/505 |
| 5,969,372 A | * | 10/1999 | Stavely et al. | 250/559.42 |
| 6,646,770 B2 | * | 11/2003 | Lee et al. | 358/509 |
| 2007/0297020 A1 | * | 12/2007 | Shen et al. | 358/474 |

FOREIGN PATENT DOCUMENTS

| | | |
|---|---|---|
| JP | 63-172570 A | 7/1988 |
| JP | S63-172570 A | 7/1988 |
| JP | 07-303169 A | 11/1995 |
| JP | 2000-151919 A | 5/2000 |
| JP | 2001-160887 A | 6/2001 |
| JP | 2001-333254 A | 11/2001 |
| JP | 2002-271546 A | 9/2002 |
| JP | 2002-330269 A | 11/2002 |
| JP | 2003-098920 A | 4/2003 |
| JP | 2003-162014 A | 6/2003 |

* cited by examiner

*Primary Examiner*—Houshang Safaipour
(74) *Attorney, Agent, or Firm*—Global IP Counselors, LLP

(57) ABSTRACT

The present invention provides an image reading device, an image printing system and image forming device in which variation in light intensity caused by the continuous lighting time of an exposure lamp serving as a light source for reading an original is prevented, a read image is prevented from deteriorating and wasteful power consumption is prevented. The exposure lamp is turned off after a predetermined time has passed from a time when the original finishes passing through a reading position or the original is conveyed to a standby position. Alternatively, the exposure lamp is turned off without setting the predetermined time in a group-copy mode.

20 Claims, 13 Drawing Sheets

IMAGE READING DEVICE, IMAGE PROCESSING SYSTEM AND IMAGE FORMING DEVICE

BACKGROUND OF THE INVENTION

1. Field of the Invention

The present invention relates to an image forming device such as a copying machine, a printer, a facsimile, a multifunction device which combines all these functions, and the like, and an image reading device employed in the image forming device which reads an original that has been automatically conveyed thereto.

2. Background Information

Conventionally, an image reading device which reads an image of an original being automatically conveyed from a predetermined original tray to a conveyance path by an automatic conveying device is well-known. In addition, some image forming devices are provided with an image reading device.

A halogen lamp, a xenon lamp, a fluorescent lamp or the like is generally used as a light source of an exposure lamp for reading an image in the image reading device. However, it is known that the light intensity of such light source varies with elapsed lighting time. The term "elapsed lighting time" has two meanings: the cumulative lighting time, and the total time from the point in which the light is turned on until the light is turned off. In the former situation, the light intensity varies due to deterioration of the exposure lamp, and in the latter situation, the light intensity varies because of an increase in temperature upon the lighting of the exposure lamp.

In situations where a plurality of originals (e.g., a document having a plurality of pages) are continuously read, the exposure lamp is kept on. However, if the light intensity varies as described above, the image data will also vary depending on the original, and thus suitable image data cannot be output. Furthermore, the exposure lamp is kept on after the previously read original is read until the next original is read, that is, the exposure lamp is on even when it is not necessary. As a result, the exposure lamp needlessly deteriorates and power is wasted.

Shading correction may be performed as a method of eliminating the influence of the variation in light intensity on the image data. In addition, in order to eliminate unnecessary lighting of the exposure lamp, controlling the image reading device such that the exposure lamp is turned off at a predetermined timing has been attempted.

In addition, in situations in which a large memory capacity is required for color originals and the like, because it will take time to transfer image data in an image memory to a hard disk, or to maintain the image memory for reading after printing is completed, a period of time will elapse from the point at which reference data is obtained for shading correction until the point at which the reading is actually started. An image reading device described in Japanese unexamined patent publication number 2002-330269 tries to solve this type of problem. In other words, because the light intensity will vary after the reference data is obtained in the above situation, in this image reading device, after shading correction, the exposure lamp will be turned off when the cumulative time needed to read an original exceeds a predetermined time, and a shading correction will be performed again at the point at which an original is to be read.

One of the printing modes in an image forming device is a group-copy mode. In the group-copy mode, each time an original set on an original tray of the image reading device is automatically conveyed and read, a predetermined number of pages of image data that corresponds to the original will be printed. In the group-copy mode, because each original will be printed, only one page of image data will be stored in the image memory at a time. Therefore, the image memory can be reduced in situations in which an original has a large number of pages, or when color images or high image quality is required. However, in the group-copy mode, after image data for a particular original is read and output to the image memory, the exposure lamp will be kept on while a predetermined number of pages are printed even though the reading of the next original has not started.

In addition, in some image forming devices, when there are originals that have a large number of pages, image data will be printed every time a predetermined number of pages of the original are read. In this situation as well, because only image data for a predetermined number of pages are stored in the image memory, the image memory required can be reduced. However, the exposure lamp will be kept on while the image data for the predetermined number of pages stored in the image memory is printed, and until the reading of the next predetermined number of pages is started. Here, in situations in which there are two or more printing units, the exposure lamps will be on for an unnecessarily long period of time.

This is true not only in situations in which the image data is to be printed, but also in situations in which other image data processing, such as facsimile transmission, is to be performed, and situations in which image data is to be registered in a database of a server and the like. In other words, the same problem will occur in situations in which: (1) every time an original is read, the corresponding image data is simultaneously transmitted to a plurality of facsimile devices (simultaneously registered in a plurality of databases); (2) every time a predetermined number of pages of an original are read, the image data is transmitted to a facsimile device (registered in a database); and (3) every time a predetermined number of pages of an original are read, the image data is simultaneously transmitted to a plurality of facsimile devices (simultaneously registered in a plurality of databases).

In addition, while a plurality of originals are continuously read and the image data is processed (printed, transmitted to a facsimile or registered in a database), there will be situations when the exposure lamp is needlessly kept on due to the processing means of the image forming device. More specifically, in situations in which a lack of toner is detected, in situations in which a facsimile calls, in situations in which a connection confirmation to a server is performed, in situations in which the device enters a periodic image processing adjustment mode (e.g., current adjustment for the charging device, toner density adjustment, fixing temperature adjustment, etc.), and the like.

Therefore, the exposure lamp is kept on for a long period of time due to the aforementioned image data processing mode and the aforementioned processing means, which causes image deterioration and increases power consumption. These problems are not solved in the image reading device described in Japanese unexamined patent publication number 2002-330269. In this prior art reference, because only the time needed to read an original is measured, in situations where the exposure lamp is kept on while no reading operation is being performed as described above, the exposure lamp will be unnecessarily kept on and the cumulative lighting time will increase.

The present invention is made in view of the above problems, and it is an object of thereof to provide an image reading device that controls variation in light intensity that occurs during the time in which an exposure lamp (a light source for reading an original) is lit, prevents deterioration of a read image, and prevents wasteful power consumption.

In addition, it is another object of the present invention to provide an image processing system and an image forming device that controls variation in light intensity that occurs during the time in which an exposure lamp (a light source for reading an original) is lit, prevents deterioration of a read image, and not only obtains suitable printed material, transmission data, or registration data, but also prevents wasteful power consumption.

SUMMARY OF THE INVENTION

In order to achieve the above objects, an image reading device according to one aspect of the present invention includes original conveying means for conveying an original from a predetermined original tray to a reading position in which an image of the original is read, reading means for reading the image of the original being conveyed by irradiation using an exposure lamp, control means for allowing conveyance of the original to the reading position and for switching on and switching off of the exposure lamp, and clocking means which starts to measure time when the original finishes passing through the reading position. Here, when the reading means continuously reads a plurality of originals and when a time measured by the clocking means reaches a predetermined time before conveyance of the next original to the reading position is allowed, then the control means switches off the exposure lamp.

In a preferred embodiment, when conveyance of the next original to the reading position is allowed by the control means then the control means switches on the exposure lamp if the exposure lamp is off and obtains reference data for shading correction prior to output of the image data.

An image processing system according to the present invention includes an image reading device, a storage device in which image data of the original read by the reading means is stored, and a node for processing the image data stored in the storage device.

An image reading device according to another aspect of the present invention includes original conveying means for conveying an original from a predetermined original tray to a standby position, temporarily holding the original at the standby position and then conveying the original to a reading position in which an image of the original is read, reading means for reading the image of the original being conveyed by irradiation using an exposure lamp, control means for allowing conveyance of the original to the reading position and for switching on and switching off of the exposure lamp, and clocking means which starts to measure time when the original reaches the standby position. Here, when the reading means continuously reads a plurality of originals and when a time measured by the clocking means reaches a predetermined time before conveyance of the next original to the reading position is allowed, then the control means switches off the exposure lamp.

In a preferred embodiment, when conveyance of the next original to the reading position is allowed by the control means then the control means switches on the exposure lamp if the exposure lamp is off and obtains reference data for shading correction prior to an output of the image data.

An image processing system according to another aspect of the present invention includes the above image reading device, a storage device in which image data of the original read by the reading means is stored, and a node for processing the image data stored in the storage device.

An image reading device connected to a node according to another aspect of the present invention includes original conveying means for conveying an original from a predetermined original tray to a reading position in which an image of the original is read, reading means for reading the image of the original being conveyed by irradiation using an exposure lamp, and control means for switching on and switching off of the exposure lamp. Here, when the reading means continuously reads a plurality of originals, if the node is in a mode that processes the image data that corresponds to an original every time a predetermined number of pages of an original are read, after the original has passed through the reading position, then the control means will switch off the exposure lamp.

In a preferred embodiment, the mode in which the node is set conducts image data processing for a predetermined number of times or more with respect to the same original.

In a preferred embodiment, the control means further allows the original to be conveyed to the reading position and the control means switches on the exposure lamp if the exposure lamp is off and obtains reference data for shading correction prior to an output of the image data.

An image processing system according to another aspect of the present invention includes the above image reading, a storage device in which image data of the original read by the reading means is stored, and a node for processing the image data stored in the storage device.

An image reading device connected to a node according to another aspect of the present invention includes original conveying means for conveying an original from a predetermined original tray to a standby position, temporarily holding the original at the standby position and then conveying the original to a reading position in which an image of the original is read, reading means for reading the image of the original being conveyed by irradiation using an exposure lamp, and control means for switching on and switching off of the exposure lamp. Here, when the reading means continuously reads a plurality of originals, if the node is in a mode that processes the image data that corresponds to an original every time a predetermined number of pages of an original are read, after the original has passed through the reading position, then the control means will switch off the exposure lamp.

In a preferred embodiment, the mode in which the node is set conducts image data processing for a predetermined number of times or more with respect to the same original.

In a preferred embodiment, the control means further allows the original to be conveyed to the reading position and the control means switches on the exposure lamp if the exposure lamp is off and obtains reference data for shading correction prior to an output of the image data.

An image processing system according to another aspect of the present invention includes the above image reading device, a storage device in which image data of the original read by the reading means is stored, and a node for processing the image data stored in the storage device.

An image forming device according to another aspect of the present invention includes original conveying means for conveying an original from a predetermined original tray to a reading position in which an image of the original is read, reading means for reading the image of the original being conveyed by irradiation using an exposure lamp, control means for allowing conveyance of the original to the reading position and for switching on and switching off of the exposure lamp, clocking means which starts to measure time when the original finishes passing through the reading position, storage means for storing image data of the original read by the reading means, and processing means for processing the image data stored in the storage means. Here, when the reading means continuously reads a plurality of originals and when a time measured by the clocking means reaches a predetermined time before conveyance of the next original to the reading position is allowed, then the control means switches off the exposure lamp.

In a preferred embodiment, when conveyance of the next original to the reading position is allowed by the control means then the control means switches on the exposure lamp if the exposure lamp is off and obtains reference data for shading correction prior to an output of the image data.

An image forming device according to another aspect of the present invention includes original conveying means for conveying an original from a predetermined original tray to a standby position, temporarily holding the original at the standby position and then conveying the original to a reading position in which an image of the original is read, reading means for reading the image of the original being conveyed by irradiation using an exposure lamp, control means for allowing conveyance of the original to the reading position and for switching on and switching off of the exposure lamp, clocking means which starts to measure time when the original is conveyed to the standby position, storage means for storing image data of the original read by the reading means, and processing means for processing the image data stored in the storage means. Here, when the reading means continuously reads a plurality of originals and when a time measured by the clocking means reaches a predetermined time before conveyance of the next original to the reading position is allowed, then the control means switches off the exposure lamp.

In a preferred embodiment, when conveyance of the next original to the reading position is allowed by the control means then the control means switches on the exposure lamp if the exposure lamp is off and obtains reference data for shading correction prior to an output of the image data.

An image forming device according to another aspect of the present invention includes original conveying means for conveying an original from a predetermined original tray to a reading position in which an image of the original is read, reading means for reading the image of the original being conveyed, by irradiation using an exposure lamp, control means for switching on and switching off of the exposure lamp, storage means for storing image data of the original read by the reading means, and processing means for processing the image data stored in the storage means. Here, when the reading means continuously reads a plurality of originals, if the device is in a mode that processes the image data that corresponds to an original every time a predetermined number of pages of an original are read, after the original has passed through the reading position, then the control means will switch off the exposure lamp.

In a preferred embodiment, the mode in which the node is set conducts image data processing for a predetermined number of times or greater with respect to the same original.

In a preferred embodiment, the control means further allows the original to be conveyed to the reading position and the control means switches on the exposure lamp if the exposure lamp is off and obtains reference data for shading correction prior to an output of the image data.

An image reading device according to another aspect of the present invention includes original conveying means for automatically conveying an original from a predetermined original tray, reading means for reading the image of the original being conveyed, by irradiation using an exposure lamp, control means for switching on and switching off of the exposure lamp, storage means for storing image data of the original read by the reading means, and processing means for processing the image data stored in the storage means. Here, when the reading means continuously reads a plurality of originals, if the device is in a mode that processes the image data that corresponds to an original every time a predetermined number of pages of an original are read, after the original has passed through the reading position, then the control means will switch off the exposure lamp.

In a preferred embodiment the mode in which the node is set conducts image data processing for a predetermined number of times or greater with respect to the same original.

In a preferred embodiment, the control means further allows the original to be conveyed to the reading position and the control means switches on the exposure lamp if the exposure lamp is off and obtains reference data for shading correction prior to an output of the image data.

An image reading device according to another aspect of the present invention includes original conveying means for automatically conveying an original from a predetermined original tray, reading means for reading an image of the original being conveyed by irradiation using an exposure lamp, control means for switching on and switching off of the exposure lamp, output means for outputting read image data to be stored in a storage device, clocking means which starts to measure time when the output of the image data is completed, and output requesting means for requesting the output of the image data. Here, when the reading means continuously reads a plurality of originals and when a time measured by the clocking means reaches a predetermined time before an output of the image data of the next original is requested by the output requesting means, then the control means switches off the exposure lamp.

In a preferred embodiment, when the output of the image data is requested by the output requesting means, then the control means switches on the exposure lamp if the exposure lamp is off and obtains reference data for shading correction prior to the output of the image data.

An image processing system according to the present invention includes the above image reading, a storage device in which image data output from the image reading device is stored, and a node for processing the image data stored in the storage device.

An image reading device according to another aspect of the present invention includes original conveying means for automatically conveying an original from a predetermined original tray, reading means for reading an image of the original being conveyed by irradiation using an exposure lamp, control means for switching on and switching off of the exposure lamp, output means for outputting read image data to be stored in a storage device, clocking means which starts to measure time when the original gets to a standby state so as to be read, and output requesting means for requesting the output of the image data. Here, when the reading means continuously reads a plurality of originals and when a time measured by the clocking means reaches a predetermined time before an output of the image data of the next original is requested by the output requesting means, then the control means switches off the exposure lamp.

In a preferred embodiment, when the output of the image data is requested by the output requesting means, then the control means switches on the exposure lamp if the exposure lamp is off and obtains reference data for shading correction prior to the output of the image data.

An image processing system according to the present invention includes the above image reading device, a storage device in which image data output from the image reading device is stored, and a node for processing the image data stored in the storage device.

An image reading device connected to a node according to another aspect of the present invention includes original conveying means for automatically conveying an original from a predetermined original tray, reading means for reading an image of the original being conveyed by irradiation using an exposure lamp, control means for switching on and switching off of the exposure lamp, output means for outputting read image data to be stored in a storage device, and, output requesting means for requesting the output of the image data. Here, when the reading means continuously reads a plurality of originals, if the device is in a mode that processes the image data that corresponds to an original every time a predetermined number of pages of an original are read, after the image data of the predetermined number of originals has been output from the output means, then the control means will switch off the exposure lamp.

In a preferred embodiment, the mode in which the node is set conducts image data processing for a predetermined number of times or more with respect to the same original.

In a preferred embodiment, when the output of the image data is requested by the output requesting means, then the control means switches on the exposure lamp if the exposure lamp is off and obtains reference data for shading correction prior to the output of the image data.

An image processing system according to the present invention includes the above image reading device, a storage device in which image data output from the image reading device is stored, and a node for processing the image data stored in the storage device.

An image reading device connected to a node according to another aspect of the present invention includes original conveying means for automatically conveying an original from a predetermined original tray, reading means for reading an image of the original being conveyed by irradiation using an exposure lamp, control means for switching on and switching off of the exposure lamp, output means for outputting read image data to be stored in a storage device, and output requesting means for requesting the output of the image data. Here, when the reading means continuously reads a plurality of originals, if the node is in a mode that processes the image data that corresponds to an original every time a predetermined number of originals are read, then the control means switches off the exposure lamp after the first original of the predetermined number of originals gets to a standby state so as to be read.

In a preferred embodiment, the mode in which the node is set conducts image data processing for a predetermined number of times or more with respect to the same original.

In a preferred embodiment, when the output of the image data is requested by the output requesting means, then the control means switches on the exposure lamp if the exposure lamp is off and obtains reference data for shading correction prior to the output of the image data.

An image processing system according to the present invention includes the above image reading device, a storage device in which image data output from the image reading device is stored, and a node for processing the image data stored in the storage device.

An image forming device according to another aspect of the present invention includes original conveying means for automatically conveying an original from a predetermined original tray, reading means for reading the image of the original being conveyed by irradiation using an exposure lamp, output means for outputting read image data, output requesting means for requesting the output of the image data, control means for switching on and switching off of the exposure lamp, clocking means which starts to measure time when the output of the image data is completed, storage means for storing the image data output from the output means, and processing means for processing the image data stored in the storage means. Here, when the reading means continuously reads a plurality of originals and when a time measured by the clocking means reaches a predetermined time before an output of the image data of the next original is requested by the output requesting means, then the control means switches off the exposure lamp.

In a preferred embodiment, when the output of the image data is requested by the output requesting means, then the control means switches on the exposure lamp if the exposure lamp is off and obtains reference data for shading correction prior to an output of the image data.

An image forming device according to another aspect of the present invention includes original conveying means for automatically conveying an original from a predetermined original tray, reading means for reading the image of the original being conveyed by irradiation using an exposure lamp, output means for outputting read image data, output requesting means for requesting the output of the image data, control means for switching on and switching off of the exposure lamp, clocking means which starts to measure time when the original gets to a standby state so as to be read, storage means for storing the image data output from the output means, and processing means for processing the image data stored in the storage means. Here, when the reading means continuously reads a plurality of originals and when a time measured by the clocking means reaches a predetermined time before an output of the image data of the next original is requested by the output requesting means, then the control means switches off the exposure lamp.

In a preferred embodiment, when the output of the image data is requested by the output requesting means, then the control means switches on the exposure lamp if the exposure lamp is off and obtains reference data for shading correction prior to an output of the image data.

An image forming device according to another aspect of the present invention includes original conveying means for automatically conveying an original from a predetermined original tray, reading means for reading the image of the original being conveyed by irradiation using an exposure lamp, output means for outputting read image data, output requesting means for requesting the output of the image data, control means for switching on and switching off of the exposure lamp, storage means for storing the image data output from the output means, and processing means for processing the image data stored in the storage means. Here, when the reading means continuously reads a plurality of originals, if the device is in a mode that processes the image data that corresponds to an original every time a predetermined number of pages of an original are read, after the image data of the predetermined number of originals has been output from the output means, then the control means will switch off the exposure lamp.

In a preferred embodiment, the mode in which the node is set conducts image data processing for a predetermined number of times or more with respect to the same original.

In a preferred embodiment, when the output of the image data is requested by the output requesting means, then the control means switches on the exposure lamp if the exposure lamp is off and obtains reference data for shading correction prior to an output of the image data.

An image reading device according to another aspect of the present invention includes image reading means which includes original conveying means for automatically conveying an original from a predetermined original tray, reading means for reading the image of the original being conveyed, by irradiation using an exposure lamp output means for outputting read image data, and output requesting means for requesting the output of the image data, and the device further includes control means for switching on and switching off of the exposure lamp, storage means for storing the image data output from the output means, and, processing means for processing the image data stored in the storage means. Here, when the reading means continuously reads a plurality of originals, if the node is in a mode that processes the image data that corresponds to an original every time a predetermined number of originals are read, then the control means switches off the exposure lamp after the first original of the predetermined number of originals gets to a standby state so as to be read.

In a preferred embodiment, the mode in which the node is set conducts image data processing for a predetermined number of times or more with respect to the same original.

In a preferred embodiment, when the output of the image data is requested by the output requesting means, then the control means switches on the exposure lamp if the exposure lamp is off and obtains reference data for shading correction prior to an output of the image data.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
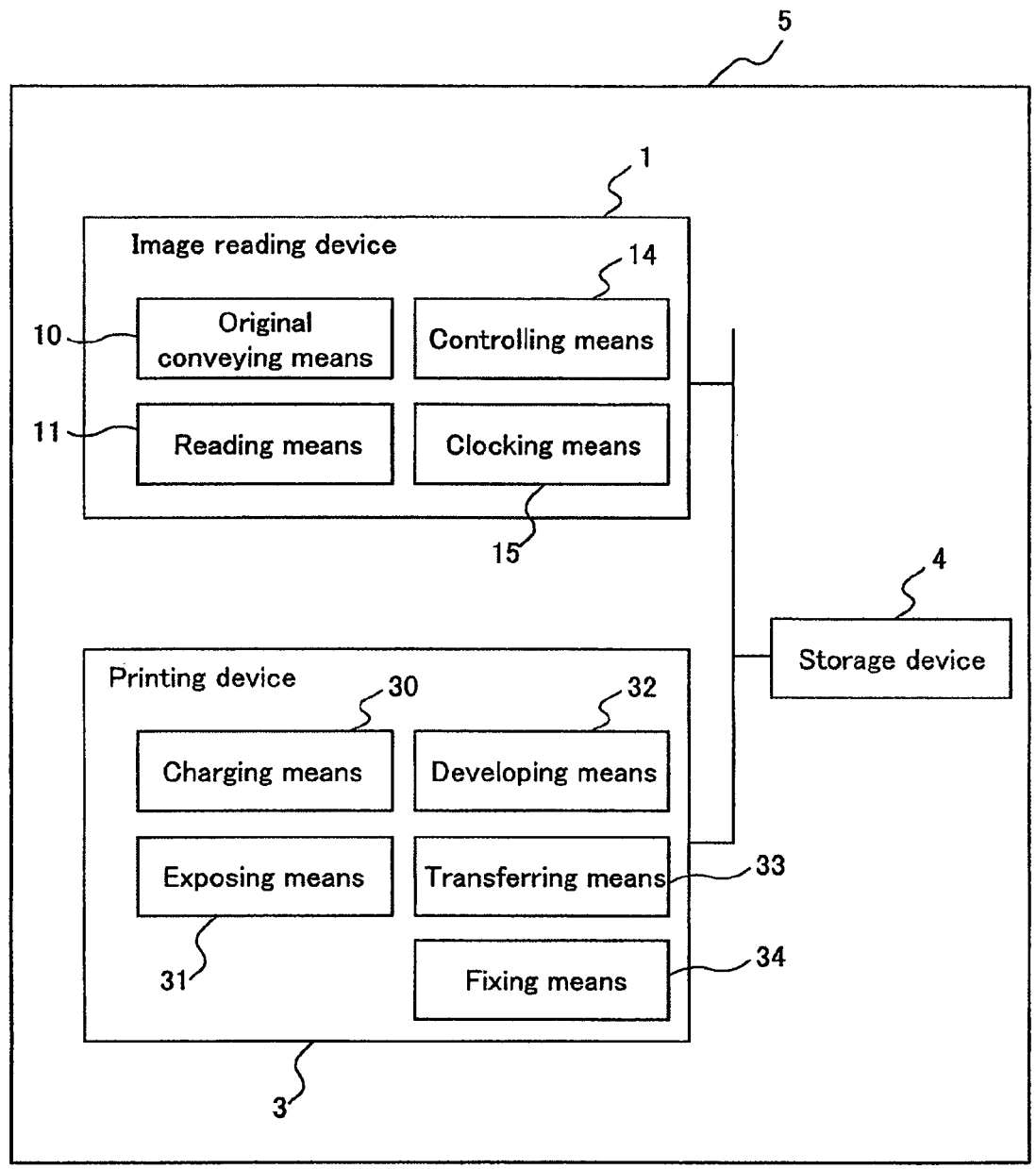
FIG. 1 is a block diagram showing the configuration of an image reading device and an image processing system according to an embodiment of the present invention.

Hereinafter, embodiments of the present invention will be described with reference to the drawings. FIG. 1 is a block diagram showing the configuration of an image reading device and an image processing system according to one embodiment of the present invention. Referring to FIG. 1, an image reading device 1 includes original conveying means 10, reading means 11, control means 14 and clocking means 15. Furthermore, the image reading device 1 is connected to a printing device 3 and a storage device 4 as nodes, and they constitute an image processing system 5.

The original conveying means 10 has a mechanism shown in FIG. 2, in which an original 116 is conveyed as follows. First, in the original conveying means 10, a sorting roller 101 separates an uppermost original 116 from other originals 116 set on an original tray 100, and guide-in rollers 102a and 102b guide the original into a conveyance path 103. Then, feed-in rollers 104 to 108 move the original 116 to a standby position A. Then, the original 116 is stopped and temporarily held at this standby position A and waits until the previously read original has finished passing through a reading position B in which an image is read, and the reading operation is ready for the original 116. Although the image data of the previous original is read and stored in the storage device 4 and further sent to the printing device 3 so as to be printed, the reading operation is ready for the next original 116 when the previously read image data is printed out or when the image data is transmitted from the storage device 4. When the image reading operation is ready, the original 116 is moved again to pass through reading position B.

When the original 116 reaches the reading position B, the reading means 11 reads the image data of the original 116. Then, an exposure lamp 112 is turned on to output light toward the original 116 and the light reflected by the original 116 is reflected by reflection plates 111 and 113, passes through a lens 114, and then reaches a CCD line sensor 115. The CCD line sensor 115 converts the light into an electrical signal to generate image data.

In addition, when reference data is obtained for shading correction, the exposure lamp 112 and the reflection plate 111 are moved toward a position just under a black and white shading plate 110. Then, the exposure lamp 112 is turned on to output light toward the shading plate 110 and the light reflected from the shading plate 110 reaches the CCD line sensor 115. At this time, reference data for correcting (shading correcting) variations in reading density of the original image and variations in the sensitivity of one pixel of the CCD line sensor 115 caused by variations in the light of the exposure lamp 112, and the light distribution characteristics of the exposure lamp 112, will be formed. The shading correction is appropriately performed for every original, every portion thereof, or the like before the image data is read.

Figure 2:
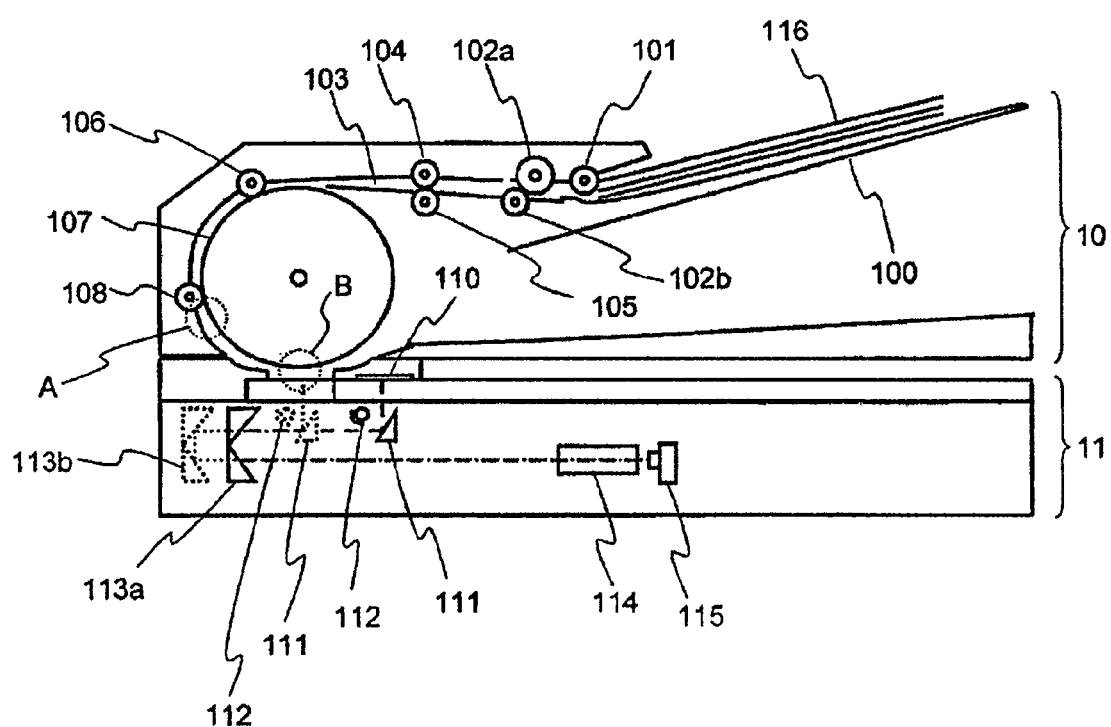
FIG. 2 is a view showing the mechanisms of an original conveying means and an image reading means.

Note that FIG. 2 shows the original conveying means 10 and the reading means 11 in a sheet-through type of automatic original conveyance device. However, the present invention can be applied to any device provided that the device has a mechanism for continuously reading a plurality of originals.

As described above, when reading of the original 1 16 is completed, the next original 116 on the original tray 100 is automatically conveyed into the conveyance path and the above operations are continuously repeated until all originals 116 have been taken from the original tray 100.

When the original 116 is continuously read as described above, in the adjustment mode and the group-copy mode of the image forming process, the clocking means 15 will measure the time until the exposure lamp 112 is switched off when the original 116 is in the standby position A. The operational timing of the clocking means 15 will be described in detail below.

The storage device 4 is connected to the image reading device 1 and the printing device 3 so that data can be exchanged therebetween, and are connected by well-known means such as a LAN, a serial cable or a bus. The storage device 4 stores the image data read by the reading means 1. The storage device 4 may be a RAM, a compact flash (TM) memory or a hard disk. In addition, the storage device 4 outputs the stored image data to the printing device 3. At this time, the image data can be processed for output to three types of printing devices. In addition, although the storage device 4 is provided outside of the image reading device 1 and the printing device 3 in FIG. 1, it may be provided inside the image reading device 1 or the printing device 3.

The printing device 3 prints the image data output from the storage device 4 on a recording medium such as a sheet of transfer paper. As the printing device 3, a well-known printer such as an electrophotographic printer, an inkjet printer, a dye sublimation printer, or a thermoelectric printer can be used. The printing device 3 in FIG. 1 uses an electrophotographic method. In the printing (image forming) process, a photoconductor (not shown) is charged by charging means 30 and the photoconductor is exposed by exposing means 31 (which is different from the exposure when the original is read) to form an electrostatic latent image based upon the image data. Then, toner is attached to the electrostatic latent image on the photoconductor (not shown) and the image is developed by the developing means 32. Then, the toner on the photoconductor is transferred to a transfer medium such as a sheet of paper by transferring means 33, and the toner image on the transfer medium is fixed by fixing means 4, whereby the printing is completed.

Note that although the description refers to situations where the printing device 3 is used, another node such as a facsimile device, a server, and the like may similarly be used. When a facsimile device is used, facsimile transmission is performed instead of printing. Alternatively, when a server is used, registration to a database is performed instead of printing. Furthermore, the storage device 4 can also be used as a registration location for the database.

Control means 14 controls the overall operation of the image reading device 1 described above, including switching on and switching off the exposure lamp 112 as well as allowing the original to be conveyed to the reading position. Furthermore, the whole image printing system including the printing device 3 and the storage device 4 may be controlled by the control means 14.

In an image forming device according to another embodiment of the present invention, the clocking means 15 can be omitted from the aforementioned image forming device 1. The other portions of this image forming device are the same as the above-described image reading device 1. This image forming device is connected to a printing device 3 and a storage device 4, which together form an image processing system. Here, the printing device 3 includes a mode in which every time a predetermined number of pages of originals are read by the reading means 11, image data corresponding to those originals will be processed. More specifically, the printing device 3 has a mode in which a preset number of pages will be printed every time one page of a predetermined number of pages of originals is read (referred to as a group-copy mode hereinafter), and a mode in which one or a plurality of pages will be printed each time a plurality of the predetermined number of pages of the original are read.

The image processing system according to the present invention can be applied in situations where another node such as a facsimile device, a server or the like is used, as well as situations where the printing device 3 is used. In other words, modes can be set in which: (1) every time an original is read, the image data corresponding to the original is simultaneously transmitted to a plurality of facsimile devices (simultaneously registered in a plurality of databases), (2) every time a predetermined number of pages of originals are read, the image data is transmitted to a facsimile device (registered in a database), and (3) like the mode described above, every time a predetermined number of pages of originals are read, the image data is simultaneously transmitted to a plurality of facsimile devices (simultaneously registered in a plurality of databases).

Figure 3:
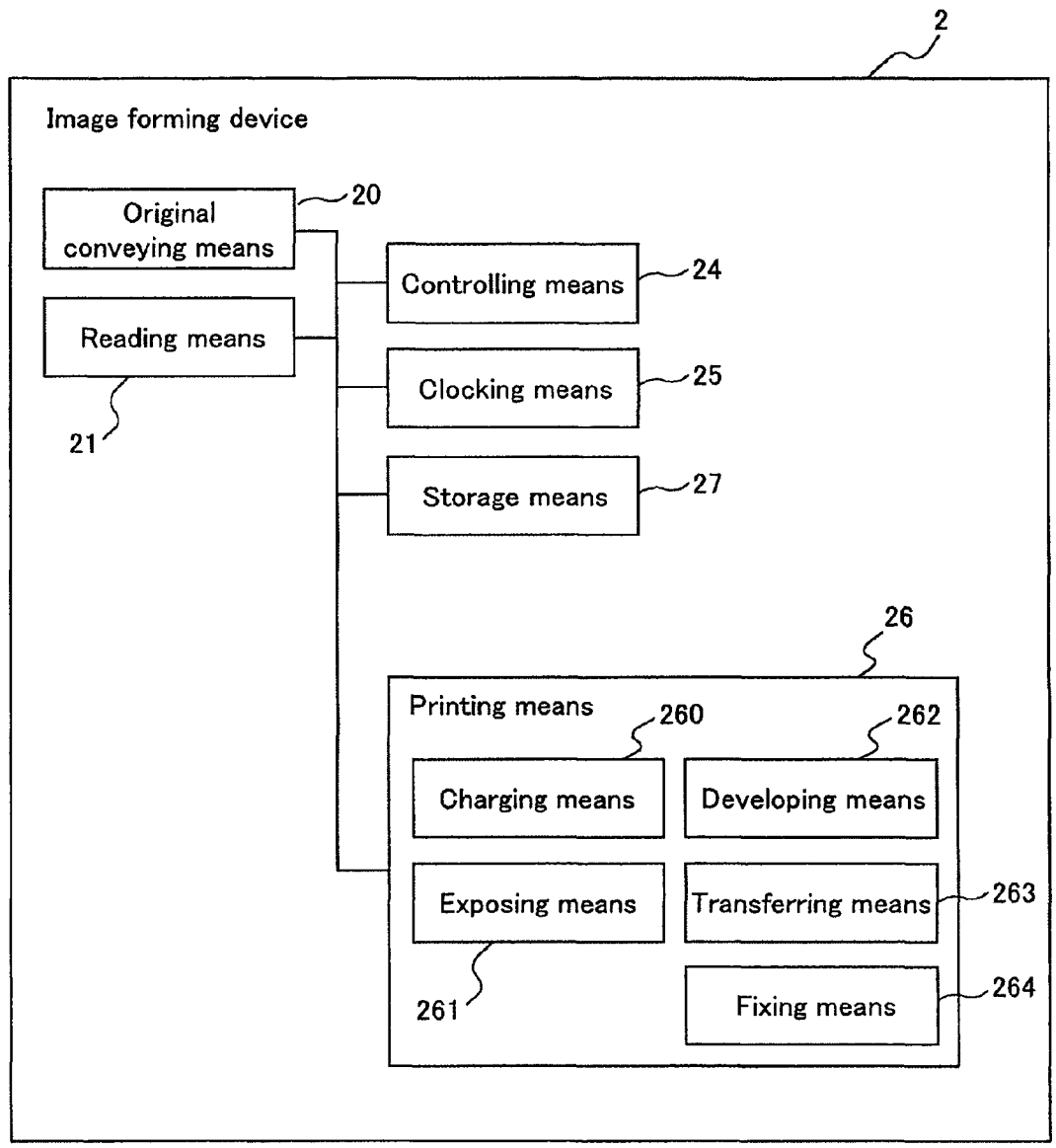
FIG. 3 is a block diagram showing the configuration of an image forming device according to an embodiment of the present invention.

FIG. 3 is a block diagram showing the configuration of the image forming device of this embodiment of the present invention. Referring to FIG. 3, an image forming device 2 includes original conveying means 20, reading means 21, control means 24, clocking means 25, printing means 26 and storage means 27. Here, the original conveying means 20 and the reading means 21 have the same configuration as that of the original conveying means 10 and the reading means 11, respectively. An example of this configuration is shown in FIG. 2.

The clocking means 25 has the same configuration as that of the clocking means 15. The operational timing of the clocking means 25 will be described in detail below.

The storage means 27 stores the image data read by the reading means 21. The storage means 27 may be a RAM, a compact flash (TM) memory or a hard disk. In addition, the storage means 27 outputs the stored image data to the printing means 26. At this time, the image data can be processed for output to the particular type of printing means 26 being employed.

The printing means 26 prints the image data output from the storage means 27 on a recording medium such as a sheet of transfer paper. A well-known printer such as an electrophotographic printer, an inkjet printer, a dye sublimation printer or a thermoelectric printer can be used as the printing means 26. The printing means 26 in FIG. 3 is an electrophotographic type of printing means. Referring to FIG. 3, charging means 260, exposing means 261, developing means 262, transferring means 263 and fixing means 264 are the same as the charging means 30, exposing means 31, developing means 32, transferring means 33 and fixing means 34.

Control means 24 controls the overall operation of the image forming device 2 described above, including switching on and switching off of the exposure lamp 112.

According to another embodiment of the present invention, an image forming device can be formed such that the clocking means 25 may be omitted from the image forming device 2, and may also include a mode in which each time a predetermined number of pages of originals are read, image data corresponding to those originals is processed. The other portions of this image forming device are the same as those of the aforementioned image forming device 2.

Note that although the description refers to situations where the printing means 26 is used, another node such as a facsimile, a server or the like may similarly be used. When a facsimile means is used, facsimile transmission is performed instead of printing. Alternatively, when a server is used, registration to a database is performed instead of printing. Furthermore, the storage means 27 can also be used as a registration location for the database.

Figure 4:
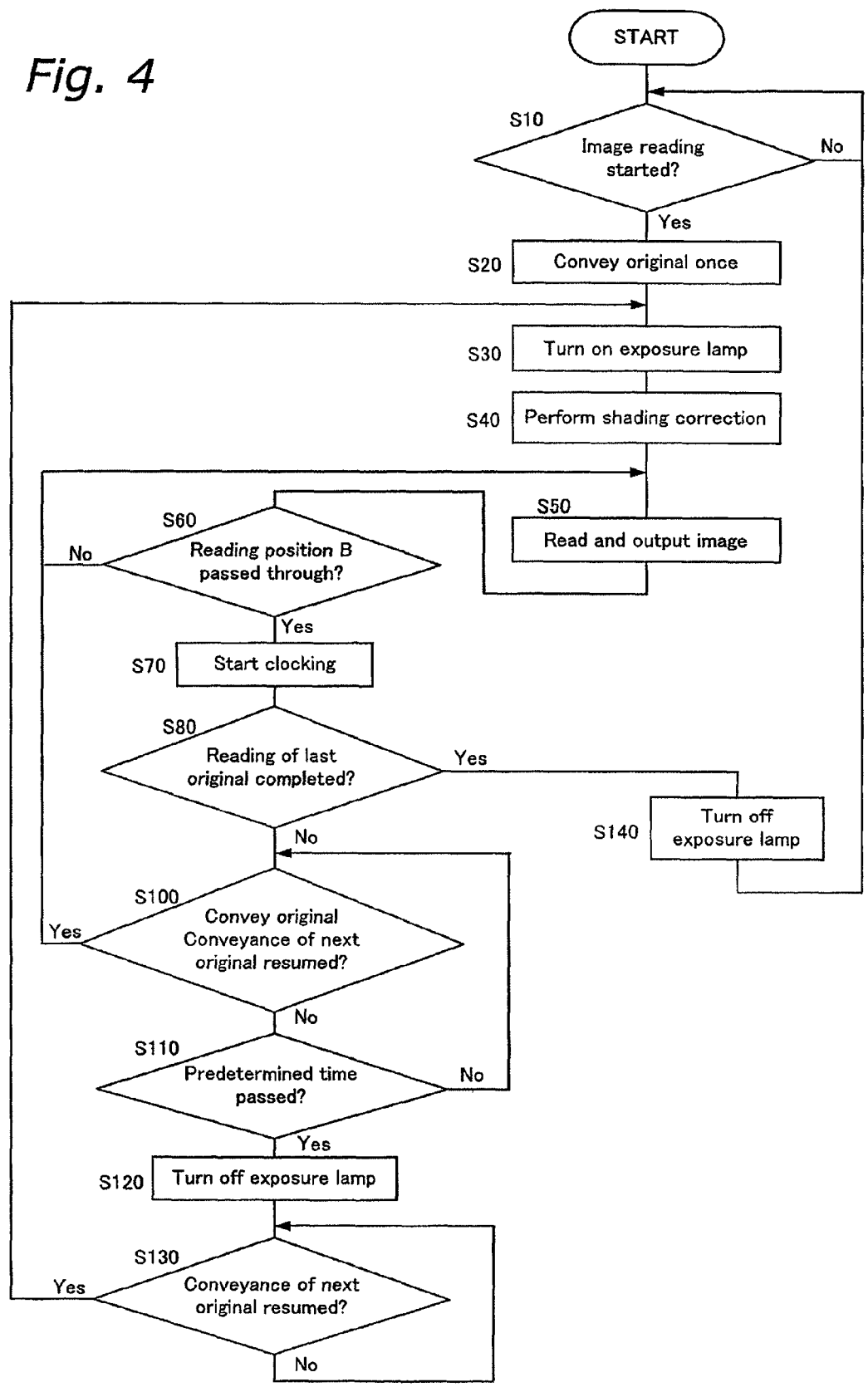
FIG. 4 is a flowchart showing a specific example of image reading procedures of the image reading device according to an embodiment of the present invention.

Next, image reading procedures of the image reading device according to the present invention will be described. FIG. 4 is a flowchart showing a specific example of the image reading procedures of the image reading device according to an embodiment of the present invention.

Referring to FIG. 4, when the image reading operation of the original 116 is started by a user in step S10, the operation proceeds to step S20.

Then, in step S20, the original conveying means 10 conveys the original 116 to a standby position A and temporarily holds the original 116 at the standby position A. Then, the exposure lamp 112 and the reflection plate 111 are moved to a position just under the shading plate 100 and the lamp is turned on (step S30), and reference data is obtained for shading correction by the reading means 11 (step S40). Then, the image of the original 116 is read in step S50. More specifically, the original 116 at the standby position A is conveyed toward the reading position B, and simultaneously therewith, the exposure lamp 112 and the reflection plate 111 are moved to the position just under the reading position B. When the image region of the original 116 reaches the reading position B, the original 116 is exposed by the exposure lamp 112 and its reflected light is received by the CCD line sensor 115, whereby the image is read. The CCD line sensor 115 converts the received light into an electric signal to form the image data. The formed image data is stored in the storage device 4. Then, in step S60, it is confirmed whether or not the original 116 has finished passing through the reading position B. If the original 116 has finished passing through the reading position B, the clocking means 15 is first reset and then started in step S70. If the original 116 has not finished passing through the reading position B, this confirmation is continuously made until the original 116 finishes passing through the reading position B.

Then, in step S80, it is confirmed whether or not the original 116 is the last original. When the original 116 is the last original, the exposure lamp 112 is turned off in step S140 and the operation is moved to step S10, in which the operation is in the standby state until a new image reading operation is started. Otherwise, if it is not the last original, the process moves on to step S100, and the next original 116 is reconveyed, i.e., it is confirmed whether or not conveyance to the reading position B is allowed. Here, the original 116 is allowed to resume the conveyance and waits at the standby position A until the operation is moved to step S50. However, if the conveyance resumption has already been allowed when the original 116 is fed, the original is conveyed to the reading position B without waiting at the standby position A.

Here, if conveyance resumption is not allowed, it is confirmed in step S110 whether a predetermined period of time has passed after the clocking means 15 started. If it has not, the operation returns to step S100 and it is confirmed whether the conveyance of the next original 116 has been resumed. If it is determined in step S110 that the predetermined period of time has passed, the exposure lamp 112 is turned off (step S120) and it is determined whether conveyance of the next original 116 is allowed (step S130). Here, if the conveyance is allowed, the exposure lamp is turned on in step S30, reference data is again obtained for shading correction (step S40), and the image is read and output (step S50).

In the event that the conveyance of the next original 116 is allowed in step S100, the operation is moved to the image reading operation in step S50 without obtaining reference data for shading correction because the lighting time of the exposure lamp 112 is short.

Note that the timing at which the conveyance of the next original 116 to the reading position B is allowed by the original conveying means 10 is normally when the output process for the image data, such as printing and the like, of the previously read original 116 have been completed, and preparations for image reading for the next original 116 have been completed. For example, in the group-copy mode, after a predetermined number of pages of the image data that corresponds to the read original 116 are printed by the printing device 3, or every time image data is printed in the normal copy mode, a space will be provided in a printing data region of the storage device 4, and thus image data of the next original 116 can be stored in the aforementioned space of the printing data region. In addition, in situations in which the operation enters a mode in the image forming process during printing, such as a mode indicating that the toner has been exhausted or a periodic adjustment mode, the conveyance will be resumed after these modes have been completed.

In the group-copy mode, facsimile calling, connection confirmation to the server, toner empty, and the adjustment mode, the aforementioned predetermined period of time is preferably set upon consideration of the time required in those situations because it will take time until the conveyance of the next original 116 to the reading position is allowed. More specifically, with respect to the group-copy mode, when preference is given to the speed at which the original is read in consideration of operational efficiency, the predetermined period of time may be set to be longer, and when preference is given to the image quality of the printing, the predetermined period of time may be set to be shorter. In addition, with respect to facsimile calling, connection confirmation to the server, toner empty, and the adjustment mode, the predetermined period of time must at least be the period of time needed for these respective modes to be completed, and may be shortened to a degree in which the reference data for shading correction is not acquired. More specifically, it may be set to be between 10 seconds and 1 minute.

As described above, in the image reading device according to this embodiment of the present invention, if the exposure lamp 112 is lit for a predetermined period of time, the exposure lamp 112 will be temporarily turned off from the point at which the original 116 finishes passing through the reading position B. Therefore, variation in light intensity caused by continuous lighting and an increase in the cumulative lighting time of the exposure lamp 112 can be prevented, the read image can be prevented from deteriorating, and wasteful power consumption can be prevented. In addition, because reference data is obtained for shading correction prior to reading of the next original image, the influence of the above variation in light intensity can be further prevented.

Figure 5:
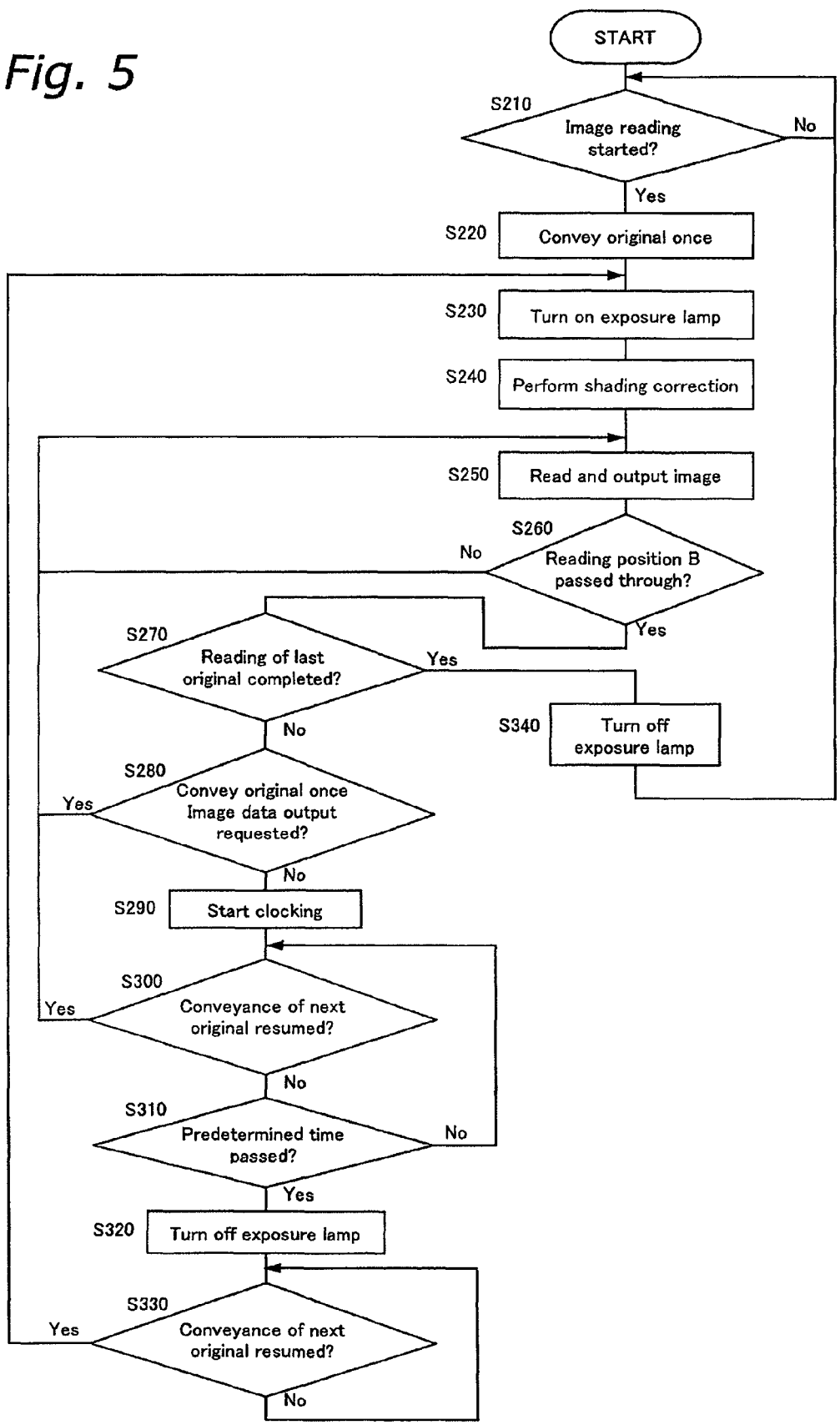
FIG. 5 is a flowchart showing another specific example of image reading procedures of the image reading device according to an embodiment of the present invention.

FIG. 5 is a flowchart showing another specific example of image reading procedures in the image reading device of this embodiment of the present invention.

Referring to FIG. 5, steps S210 to S260 are the same as steps S10 to S60. When the original 116 finishes passing through the reading position B in step S260, it will be confirmed whether the last original image has been read (step S270). If the last original image has been read, the exposure lamp 112 is turned off in step S340 and then it is determined whether an image reading operation for a new original has started (step S210). Otherwise, if the last original image has not been read, the next original 116 is fed and it is confirmed whether conveyance resumption was requested (step S280). Here, if the conveyance resumption has already been requested, the next original 116 is conveyed to the reading position B without stopping in step S250. When conveyance resumption is requested in step S280, the next original 116 waits at the standby position A. Then, in step S290, the clocking means 15 is first reset and then started, and then the operation proceeds to step S300. If the original 116 has not finished passing through the reading position B in step S260, the confirmation is repeated until it finishes passing through the reading position B.

Steps S300 to S330 are the same as steps S100 to S130.

In addition, the timing output requesting means 13 that outputs the image data is the same as described above. The predetermined period of time is also set as described above.

In the above image reading procedures, after the exposure lamp 112 is lit for the predetermined period of time starting from the point at which the next original is fed and begins to wait, the exposure lamp 112 will be temporarily turned off. Therefore, variation in light intensity caused by continuous lighting and an increase in cumulative lighting time of the exposure lamp 112 can be prevented, the read image is prevented from deteriorating and power is prevented from being wasted. In addition, because reference data is obtained for shading correction prior to the reading of the next original image, the influence of the above variations in light intensity can be further prevented.

Figure 6:
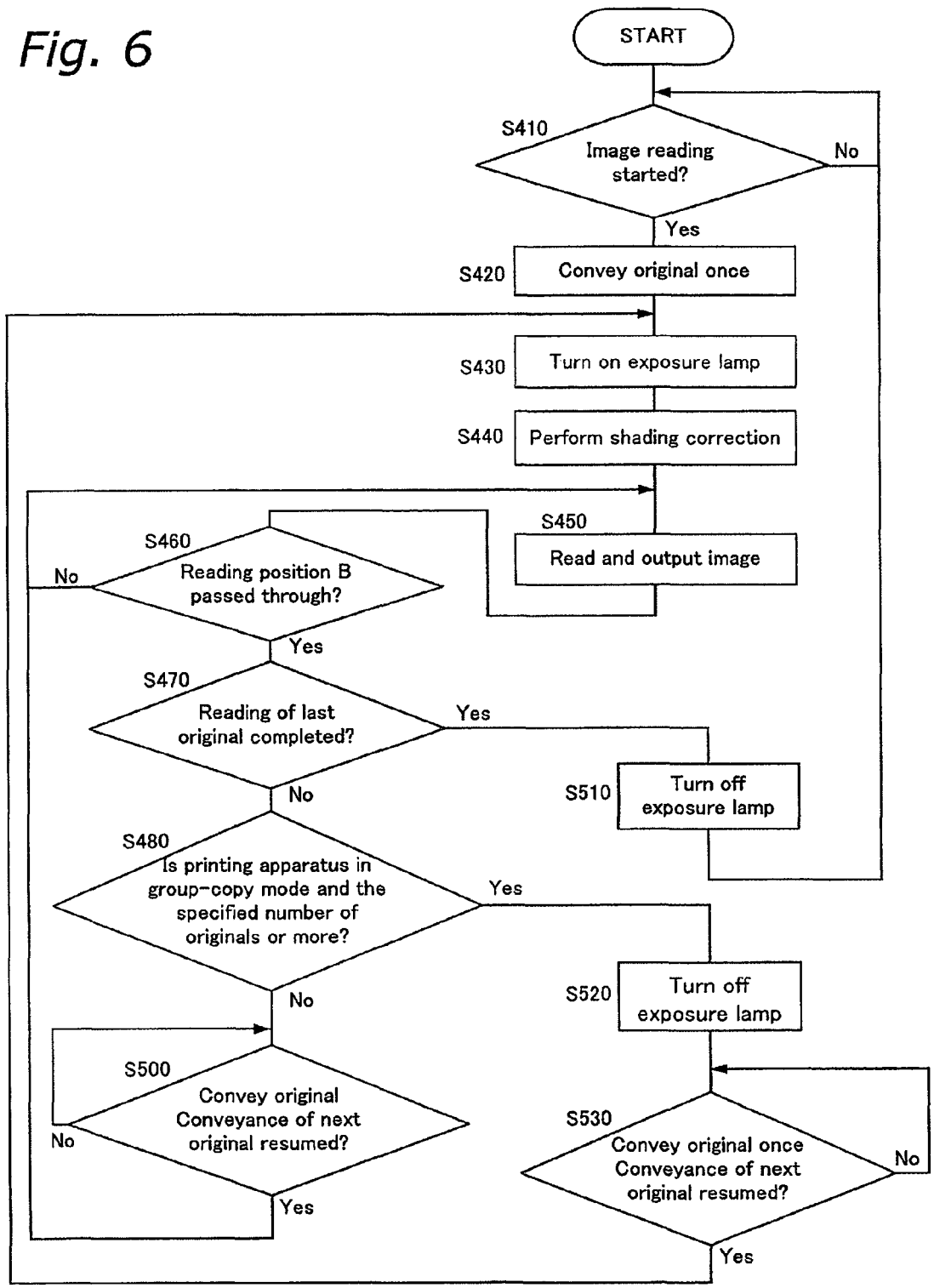
FIG. 6 is a flowchart showing a specific example of image reading procedures of an image reading device according to an embodiment of the present invention.

FIG. 6 is a flowchart showing a specific example of image reading procedures in an image reading device according to another embodiment of the present invention.

Referring to FIG. 6, steps S410 to S470 are the same as steps S210 to S270. If reading of the last original image has been completed in step S470, the exposure lamp 112 is turned off in step S510, and it is determined whether an image reading operation for a new original has started (step 410). Otherwise, if the reading of the last original image has not been completed, it is confirmed whether the printing device 3 is in the group-copy mode and whether the printed number of pages of each original is the predetermined number or greater in step S480. Here, when the printing device 3 is in the group-copy mode and the printed number of pages of an original is the predetermined number or greater, the exposure lamp 112 is turned off in step S520, and the next original is fed and waits at the standby position A until conveyance resumption is allowed in step S530. Here, when the conveyance resumption of the next original 116 is allowed, the exposure lamp is turned on in step S430, the reference data is again obtained for shading correction (step S440), and then image reading is performed (step S450).

If in step S480 the printing device 3 is not in the group-copy mode or the printed number of pages of an original is less than the predetermined number, the next original 116 is conveyed and waits until conveyance resumption is allowed by the control means 14 in step S500. At this time, if conveyance resumption has been already requested, the original 116 is conveyed to the reading position B without stopping (step S450). Otherwise, if conveyance resumption has not yet been requested, the original 116 waits at the standby position A. Then, even if conveyance resumption of the image data is requested, the image reading and outputting operations are performed without obtaining reference data for shading correction in step S450 because the lighting time of the exposure lamp 112 is short.

Note that the timing at which the conveyance of the next original 116 to the reading position B by the original conveying means 10 is allowed is the same as described above. In addition, the predetermined number of pages may be set such that the image data stored in the storage device 4 is not increased, or deterioration of the printed image by the printing device 3 is not increased. More specifically, when preference is given to reading speed of the original in consideration of operational efficiency, the predetermined number of pages will be set large and when preference is given to the image quality of the printing, the predetermined number of pages will be set to be small.

As described above, in the image reading device according to another embodiment of the present invention, when the printed number of pages of each original is the predetermined number or greater in the group-copy mode, after the original 116 finishes passing through the reading position B, the exposure lamp 112 is temporarily turned off. Therefore, variation in light intensity caused by continuous lighting and an increase in cumulative lighting time of the exposure lamp 112 can be controlled, the read image can be prevented from deteriorating, and wasteful power consumption can be prevented.

Figure 7:
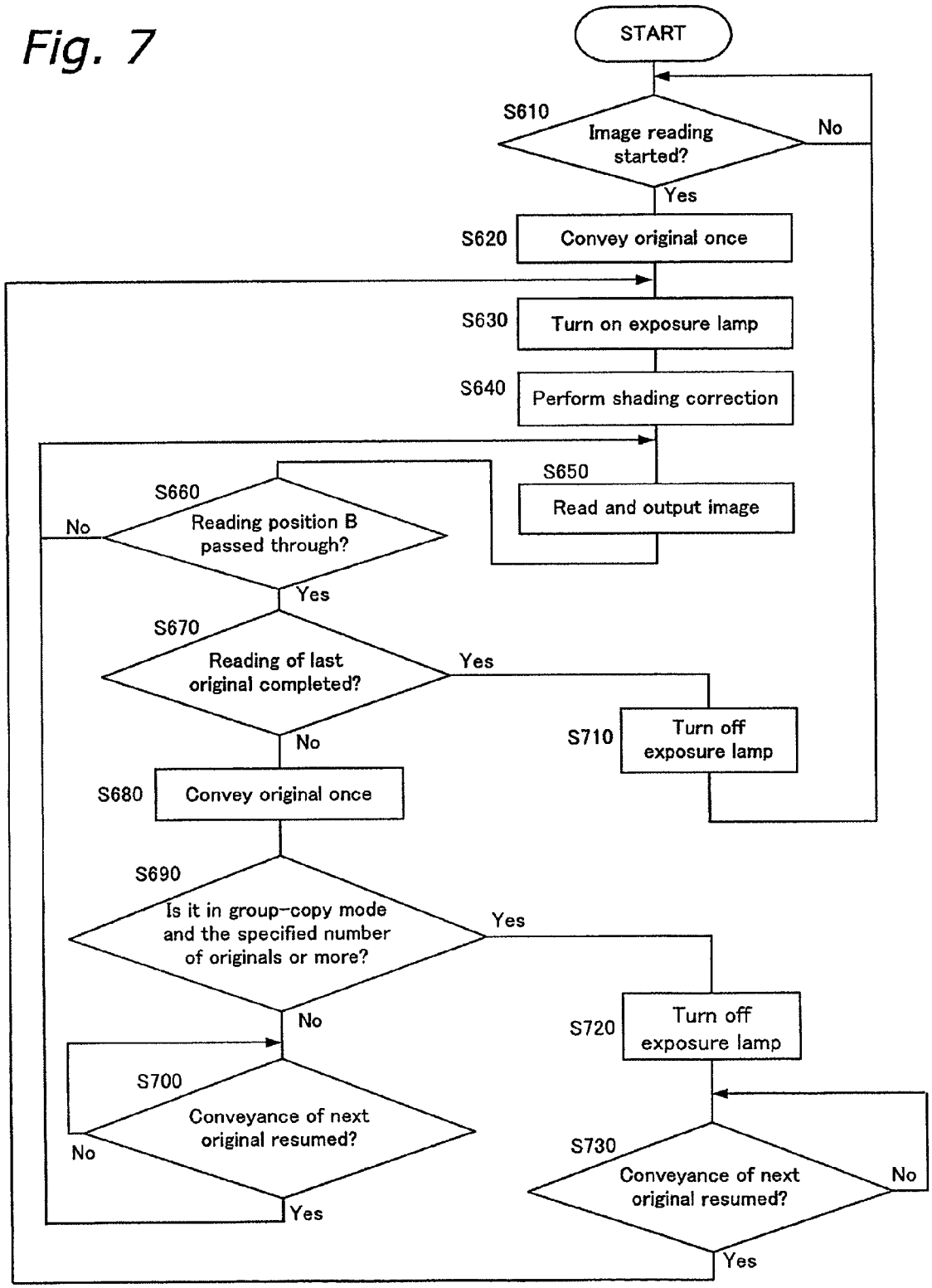
FIG. 7 is a flowchart showing another specific example of image reading procedures of the image reading device according to an embodiment of the present invention.

FIG. 7 is a flowchart showing another specific example of image reading procedures in an image reading device according to another embodiment of the present invention.

Referring to FIG. 7, step S610 to step S670 are the same as steps S410 to S470. If the reading of the last original image has been completed in step S670, the exposure lamp 112 is turned off (step S710) and it is determined whether an image reading operation for a new original is started (step 610). Otherwise, if the reading of the last original image has not been completed, it is confirmed whether the printing device 3 is in the group-copy mode and the printed number of pages of each original is a predetermined number or greater (step S690). Here, when the printing device 3 is in the group-copy mode and the printed number of pages of each original is the predetermined number or greater, the exposure lamp 112 is turned off in step S720, and then the next original 116 is conveyed and waits at the standby position A until conveyance resumption is allowed (step S730). Here, when conveyance resumption of the next original 116 is allowed, the exposure lamp is turned on in step S630, reference data for shading correction is again obtained (step S640), and then image reading is performed (step S650).

When the printing device 3 is not in the group-copy mode or the printed number of pages of each original is less than the predetermined number in step S690, the next original 116 is fed and waits until conveyance resumption of the next original 116 is allowed (step S700). At this time, if conveyance resumption has been already requested, the original 116 is conveyed to the reading position B without stopping in step S650. Otherwise, if conveyance resumption has not yet been requested, the original 116 waits at the standby position A. Then, even if conveyance resumption of the image data is requested in step S700, the image reading and output operations are performed without obtaining reference data for shading correction in step S650 because the lighting time of the exposure lamp 112 is short.

Note that the timing at which the conveyance of the next original 116 to the reading position B by the original conveying means 10 is allowed is the same as described above. In addition, the predetermined number of pages may be set as described above.

As described above, in the image reading device according to this embodiment of the present invention, if the printed number of pages of each original is the predetermined number or greater in the group-copy mode, when the next original is in the standby state for image reading, the exposure lamp 112 is temporarily turned off. Therefore, variation in light intensity caused by continuous lighting and increase in cumulative lighting time of the exposure lamp 112 can be controlled, the read image can be prevented from deteriorating, and wasteful power consumption can be prevented. In addition, because reference data for shading correction is obtained prior to the reading of the next original image, the influence of the above variation in light intensity can be further controlled.

In the image processing system of the present invention, image data output from the output means 12 is stored in the storage means 4, stored image data is output to the printing device 3, and images are printed in each embodiment of the image reading device 1.

In the image forming device of the present invention, image reading is performed with the same procedures as each of the image reading procedures of the above examples. More specifically, the original conveying means 20, the reading means 21, the control means 24 and the clocking means 25 of the image forming device operate in the same manner as the original conveying means 10, the reading means 11, the control means 14 and the clocking means 15 in each of the aforementioned examples of image reading procedures. In addition, in the image forming device of the present invention, image data of the original 116 read by the reading means 11 is stored in the storage means 27, stored image data is output to the printing means 26, and images are printed. In addition, the printing means 26, charging means 260, exposing means 261, developing means 262, transferring means 263 and fixing means 264 operate in the same manner as the charging means 30, exposing means 31, developing means 32, transferring means 33 and fixing means 34.

Figure 8:
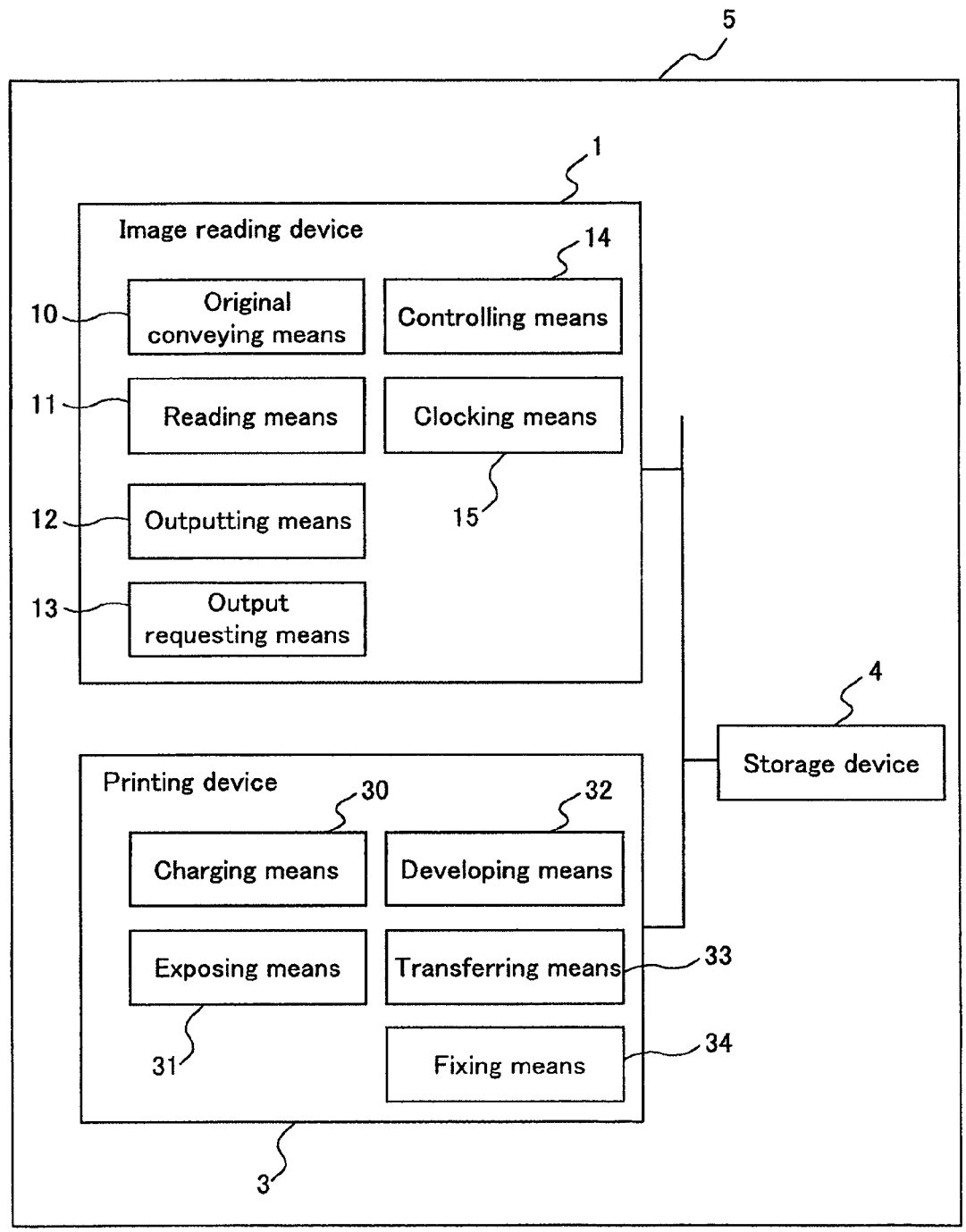
FIG. 8 is a block diagram showing the configuration of an image reading device and an image processing system according to an embodiment of the present invention.

FIG. 8 is a block diagram showing the configuration of an image reading device and an image processing system according to an embodiment of the present invention. Referring to FIG. 8, an image reading device I includes original conveying means 10, reading means 11, output means 12, output requesting means 13, control means 14 and clocking means 15. Furthermore, the image reading device 1 is connected to a printing device 3 and a storage device 4 as nodes, and they constitute an image processing system 5.

The original conveying means 10 has a mechanism shown in FIG. 2, in which an original 116 is conveyed as follows. First, in the original conveying means 10, a sorting roller 101 separates an uppermost original from the other originals 116 set on an original tray 100 and guide-in rollers 102a and 102b guide the original into a conveyance path 103. Then, feed-in rollers 104 to 108 move the original 116 to a standby position A. Then, the original 116 is stopped and temporarily held at this standby position A and waits until the previous original is read and its image data is output, and the reading operation is ready for the next original 116. Then, when an output request for the image data is made, as will be described below, the original 116 is moved again to pass through reading position B.

When the original 116 reaches the reading position B, the reading means 11 reads the image data of the original 116. Then, an exposure lamp 112 is turned on to output light toward the original 116 and the light reflected by the original 116 is reflected by reflection plates 111 and 113, passes through a lens 114, and then reaches a CCD line sensor 115. The CCD line sensor 115 converts the light into an electrical signal to generate image data.

In addition, when reference data is obtained for shading correction, the exposure lamp 112 and the reflection plate 111 are moved toward a position just under a black and white shading plate 110. Then, the exposure lamp 112 is turned on to output light toward the shading plate 110 and the light reflected, from the shading plate 110 reaches the CCD line sensor 115. At this time, reference data for correcting (shading correction) variations in reading density of the original image and variations in the sensitivity of one pixel of the CCD line sensor 115 caused by variations in the light of the exposure lamp 112, and the light distribution characteristics of the exposure lamp 112, will be formed. The shading correction is appropriately performed for every original, every portion thereof, or the like before the image data is read.

When the above output request is made, the output means 12 outputs the image data generated by the reading means 11 to the storage device 4.

The output requesting means 13 makes an output request for the image data to the output means 12. Initiated by the output request, the original conveying means 10 and the reading means 11 respectively start the conveyance and reading operations. At this time, it is not necessary to make the output request directly to the original conveying means 10 and the reading means 11, and for example, the control means 14 may control the operations of the original conveying means 10 and reading means 11 in synchronization with the above output request.

In addition, FIG. 2 shows the original conveying means 10 and the reading means 11 in a sheet-through type of automatic original conveyance device. However, the present invention can be applied to any device provided that the device has a mechanism for continuously reading a plurality of originals.

As described above, when reading of the original 116 is completed, the next original 116 on the original tray 100 is automatically conveyed into the conveyance path and the above operations are continuously repeated until all originals 116 have been taken from the original tray 100.

When the original 116 is continuously read as described above, in the adjustment mode and the group-copy mode of the image forming process, the clocking means 15 will measure the time until the exposure lamp 112 is switched off when the original 116 is in the standby position A. The operational timing of the clocking means 15 will be described in detail below.

The storage device 4 is connected to the image reading device 1 and the printing device 3 so that data can be exchanged therebetween, and are connected by well-known means such as a LAN, a serial cable or a bus. The storage device 4 stores the image data output from the output means 12. The storage device 4 may be a RAM, a compact flash (registered trademark) memory or a hard disk. In addition, the storage device 4 outputs the stored image data to the printing device 3. At this time, the image data can be processed for output to three types of printing devices. In addition, although the storage device 4 is provided outside of the image reading device 1 and the printing device 3 in FIG. 8, it may be provided inside the image reading device 1 or the printing device 3.

The printing device 3 prints the image data output from the storage device 4 on a recording medium such as a sheet of transfer paper. As the printing device 3, a well-known printer such as an electrophotographic printer, an inkjet printer, a dye sublimation printer, or a thermoelectric printer can be used. The printing device 3 in FIG. 1 uses an electrophotographic method. In the printing (image forming) process, a photoconductor (not shown) is charged by charging means 30 and the photoconductor is exposed by exposing means 31 (which is different from the exposure when the original is read) to form an electrostatic latent image based upon the image data. Then, toner is attached to the electrostatic latent image on the photoconductor (not shown) and the image is developed by the developing means 32. Then, the toner on the photoconductor is transferred to a transfer medium such as a sheet of paper by transferring means 33, and the toner image on the transfer medium is fixed by fixing means 4, whereby the printing is completed.

Note that although the description refers to situations where the printing device 3 is used, another node such as a facsimile device, a server or the like may similarly be used. When a facsimile device is used, facsimile transmission is performed instead of printing. Alternatively, when a server is used, registration to a database is performed instead of printing. Furthermore, the storage device 4 can also be used as a registration location for the database.

Control means 14 controls the operation of the image reading device I in general including switching off and switching on the exposure lamp 112. Furthermore, the whole image printing system including the printing device 3 and the storage device 4 may be controlled by the control means.

In an image forming device according to another embodiment of the present invention, the clocking means 15 can be omitted from the aforementioned image reading device 1. The other portions of this image forming device are the same as the above-described image reading device 1. The image forming device is connected to a printing device 3 and a storage device 4, which together form an image processing system. Here, the printing device 3 includes a mode in which every time an original having a predetermined number of pages is read, image data corresponding to the original will be processed. More specifically, there is a mode in which a preset number of pages will be printed each time one page of the predetermined number of pages of the original is read (referred to as a group-copy mode hereinafter), and a mode in which one or a plurality of pages will be printed each time a plurality of the predetermined number of pages of the original are read.

The image processing system according to the present invention can be applied in situations where another node such as a facsimile device, a server or the like is used as well as situations where the printing device 3 is used. In other words, modes can be set in which: (1) every time an is read, the image data corresponding to the original is simultaneously transmitted to a plurality of facsimile devices (simultaneously registered in a plurality of databases), (2) every time a predetermined number of pages of originals are read, the image data is transmitted to a facsimile device (registered in a database), and (3) like the mode described above, every time a predetermined number of pages of originals are read, the image data is simultaneously transmitted to a plurality of facsimile devices (simultaneously registered in a plurality of databases).

Figure 9:
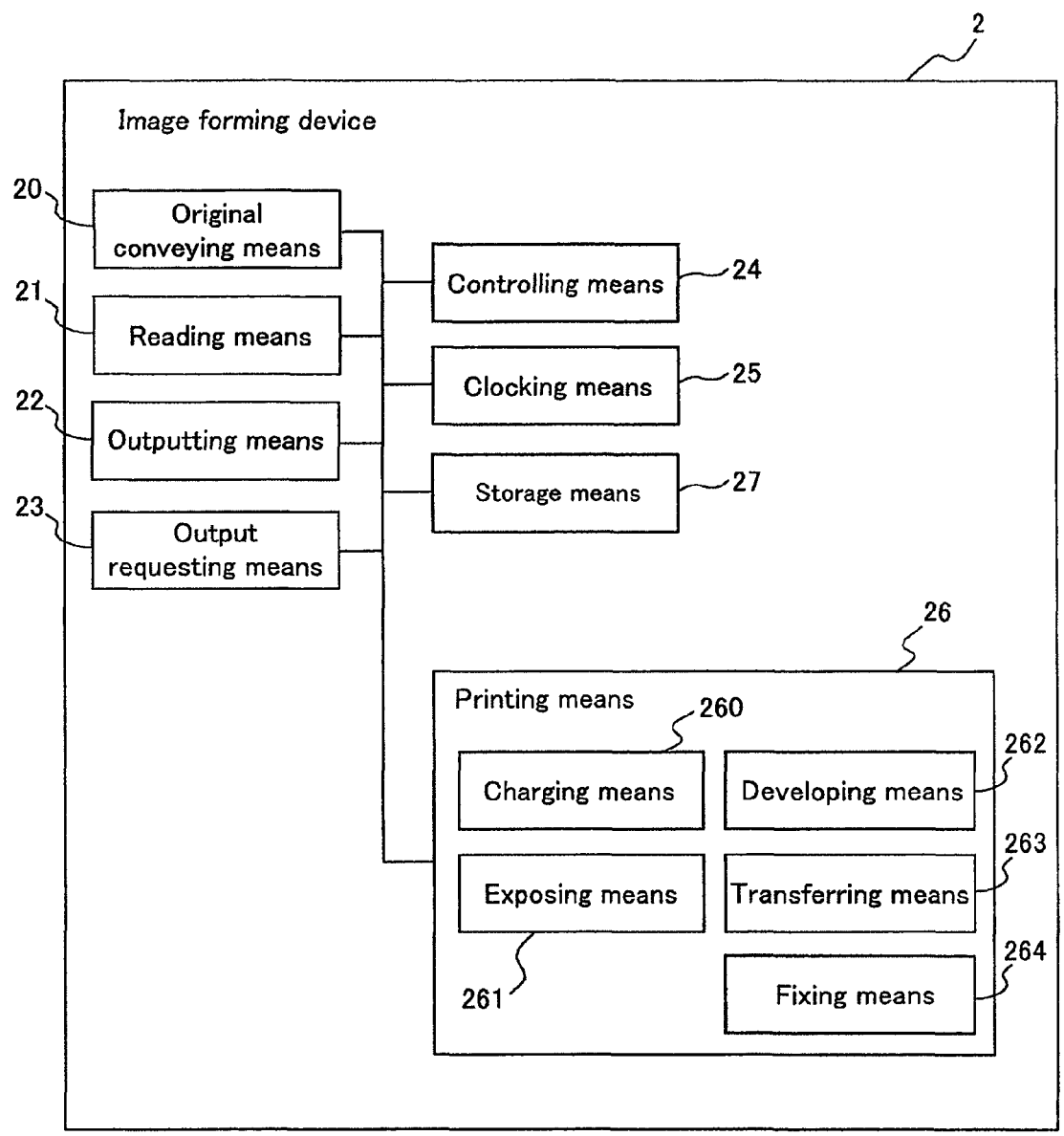
FIG. 9 is a block diagram showing the configuration of an image forming device according to an embodiment of the present invention.

FIG. 9 is a block diagram showing the configuration of the image forming device of this embodiment of the present invention. Referring to FIG. 9, an image forming device 2 includes original conveying means 20, reading means 21, output means 22, output requesting means 23, control means 24, clocking means 25, printing means 26 and storage means 27. Here, the original conveying means 20 and the reading means 21 have the same configuration as that of the original conveying means 10 and the reading means 11, respectively. An example of this configuration is shown in FIG. 2. The output requesting means 23 makes an output request for the image data to the output means 22 similar to the above output requesting means 13.

The output means 22 outputs the image data generated by the reading means 21 to the storage means 27. The clocking means 25 has the same configuration as that of the clocking means 15. The operational timing of the clocking means 25 will be described in detail below.

The storage means 27 stores the image data output from the output means 22. The storage means 27 may be a RAM, a compact flash (registered trademark) memory or a hard disk. In addition, the storage means 27 outputs the stored image data to the printing means 26. At this time, the image data can be processed for output to the particular type of printing means 26 being employed.

The printing means 26 prints the image data output from the storage means 27 on a recording medium such as a sheet of transfer paper. A well-known printer such as an electrophotographic printer, an inkjet printer, a dye sublimation printer or a thermoelectric printer can be used as the printing means 26. The printing means 26 in FIG. 9 is an electrophotographic type of printing means. Referring to FIG. 9, charging means 260, exposing means 261, developing means 262, transferring means 263 and fixing means 264 are the same as the charging means 30, exposing means 31, developing means 32, transferring means 33 and fixing means 34.

Control means 24 controls the overall operation of the image forming device 2 described above, including switching on and switching off of the exposure lamp 112.

According to another embodiment of the present invention, an image forming device can be formed such that the clocking means 25 may be omitted from the image forming device 2, and may also include a mode that processes image data corresponding to an original having a predetermined number of pages each time that original is read. The other portions of this image forming device are the same as those of the aforementioned device 2.

Note that although the description refers to situations where the printing means 26 is used, another node such as a facsimile, a server or the like may similarly be used. When a facsimile means is used, facsimile transmission is performed instead of printing. Alternatively, when a server is used, registration to a database is performed instead of printing. Furthermore, the storage means 27 can be used also as a registration location for the database.

Figure 10:
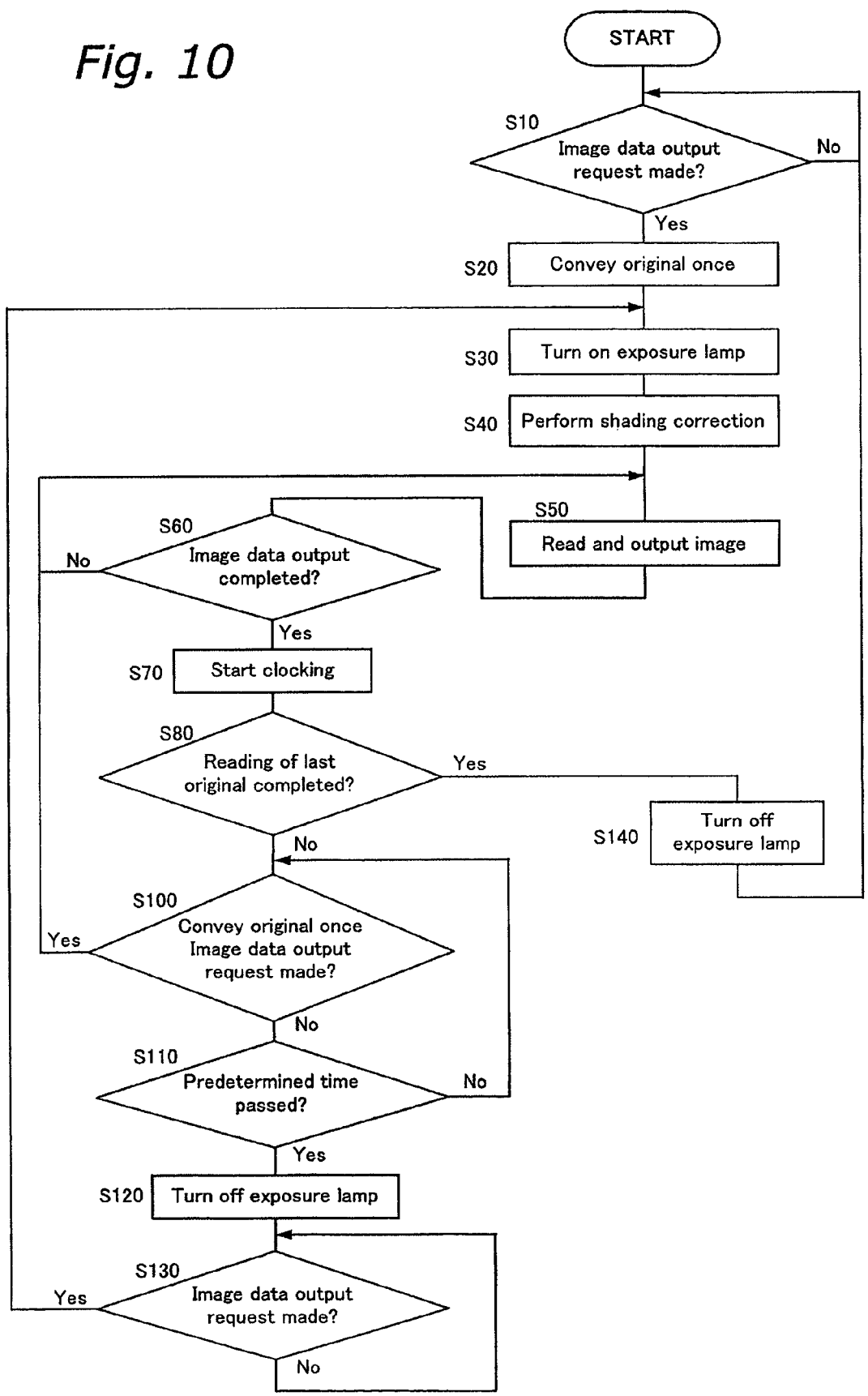
FIG. 10 is a flowchart showing a specific example of image reading procedures of the image reading device according to an embodiment of the present invention.

Next, image reading procedures of the image reading device according to the present invention will be described. FIG. 10 is a flowchart showing a specific example of the image reading procedures of the image reading device according to an embodiment of the present invention.

Referring to FIG. 10, when an output request for the image data has been requested by the output requesting means 13 in step S10, the operation proceeds to step S20. If the output request has not been made, the confirmation is repeated until the output request is made.

Then, in step S20, the original conveying means 10 conveys the original 116 to a standby position A and temporarily holds the original 116 at the standby position A. Then, in the reading means 11, the exposure lamp 112 and the reflection plate 111 are moved to a position just under the shading plate 100 and the lamp is turned on (step S30), and reference data is obtained for shading correction by the reading means 11 (step S40). Then, the image of the original 116 is read and the image data is output in step S50. More specifically, the original 116 at the standby position A is conveyed toward the reading position B, and simultaneously therewith, the exposure lamp 112 and the reflection plate 111 are moved to the position just under the reading position B. When the image region of the original 116 reaches the reading position B, the original 116 is exposed by the exposure lamp 112 and its reflected light is received by the CCD line sensor 115, whereby the image is read. The CCD line sensor 115 converts the received light into an electric signal to form the image data. The formed image data is output to the storage device 4. Then, in step S60, it is confirmed whether or not output of the image data is completed or not. When it is completed, the clocking means 15 is first reset and then started in step S70. If it has not been completed, this confirmation is continuously made until the original 116 finishes passing through the reading position B and the above output is completed.

Then, in step S80, it is confirmed whether or not the original 116 is the last original. When the original 116 is the last original, the exposure lamp 112 is turned off in step S140 and the operation is moved to step S10, in which the operation is in the standby state until an output request for image data of a new original is made. Otherwise, if it is not the last original, the process moves on to step S100, and the next original 116 is reconveyed, i.e., it is confirmed whether or not an output request for the image data has been made by the output requesting means 13. Here, the original 116 waits at the standby position A until the output request for the image data is newly made and the operation proceeds to step S50. However, if the output request for the image data has been already made when the original 116 is fed, the original 116 is conveyed to the reading position B without waiting at the standby position A.

Here, if the output request is not made, it is confirmed in step S110 whether a predetermined period of time has passed after the clocking means 15 started. If it has not, the operation returns to step S100 and it is again confirmed whether the output request for the image data has been made. If it is determined in step S110 that the predetermined period of time has passed, the exposure lamp 112 is turned off (step S120) and it is determined whether the output request for the image data has been made (step S130). Here, if the output request is made, the exposure lamp is turned on in step S30, reference data is again obtained for shading correction (step S40), and the image is read and output (step S50).

When the output request for the image data is made in step S100, because the lighting time of the exposure lamp 112 is short, the image is read and output in step S50 without obtaining reference data for shading correction.

Note that the timing at which the output request for the image data is made by the output requesting means 13 is normally when the image data can be output to the storage device 4. For example, because a space will be provided in a printing data region of the storage device 4 either (1) after the image data that corresponds to a predetermined number of pages of the original 116 are printed by the printing device 3 in the group-copy mode, or (2) every time the image data is printed in the normal copy mode, the above timing will be determined based on when the image data of the next original 116 can be stored in the above space of the printing data region. In addition, in situations in which the operation enters a mode in the image forming process during printing, such as a mode indicating that the toner has been exhausted or a periodical adjustment mode, the output request will be made after these modes have been completed.

In the group-copy mode, facsimile calling, connection confirmation to the server, toner empty, and the adjustment mode, the aforementioned predetermined period of time is preferably set upon consideration of the time required in those situations because it will take time until the image data of the next original 116 can be output. More specifically, with respect to the group-copy mode, when preference is given to the speed at which the original is read in consideration of operational efficiency, the predetermined period of time may be set to be longer, and when preference is given to the image quality of the printing, the predetermined period of time may be set to be shorter. In addition, with respect to facsimile calling, connection confirmation to the server, toner empty, and the adjustment mode, the predetermined period of time must at least be the period of time needed for these respective modes to be completed, and may be shortened to a degree in which the reference data for shading correction is not acquired. More specifically, it may be set to be between 10 seconds and 1 minute.

As described above, in the image reading device according to this embodiment of the present invention, the exposure lamp 112 will be temporarily turned off after the exposure lamp 112 has been lit for a predetermined time, starting from the time the output of the image data to the storage device 4 is completed. Therefore, variation in light intensity caused by continuous lighting and an increase in cumulative lighting time of the exposure lamp 112 can be prevented, the read image can be prevented from deteriorating and wasteful power consumption can be prevented. In addition, because reference data is obtained for shading correction prior to reading of the next original image, the influence of the above variation in light intensity can be further prevented.

Figure 11:
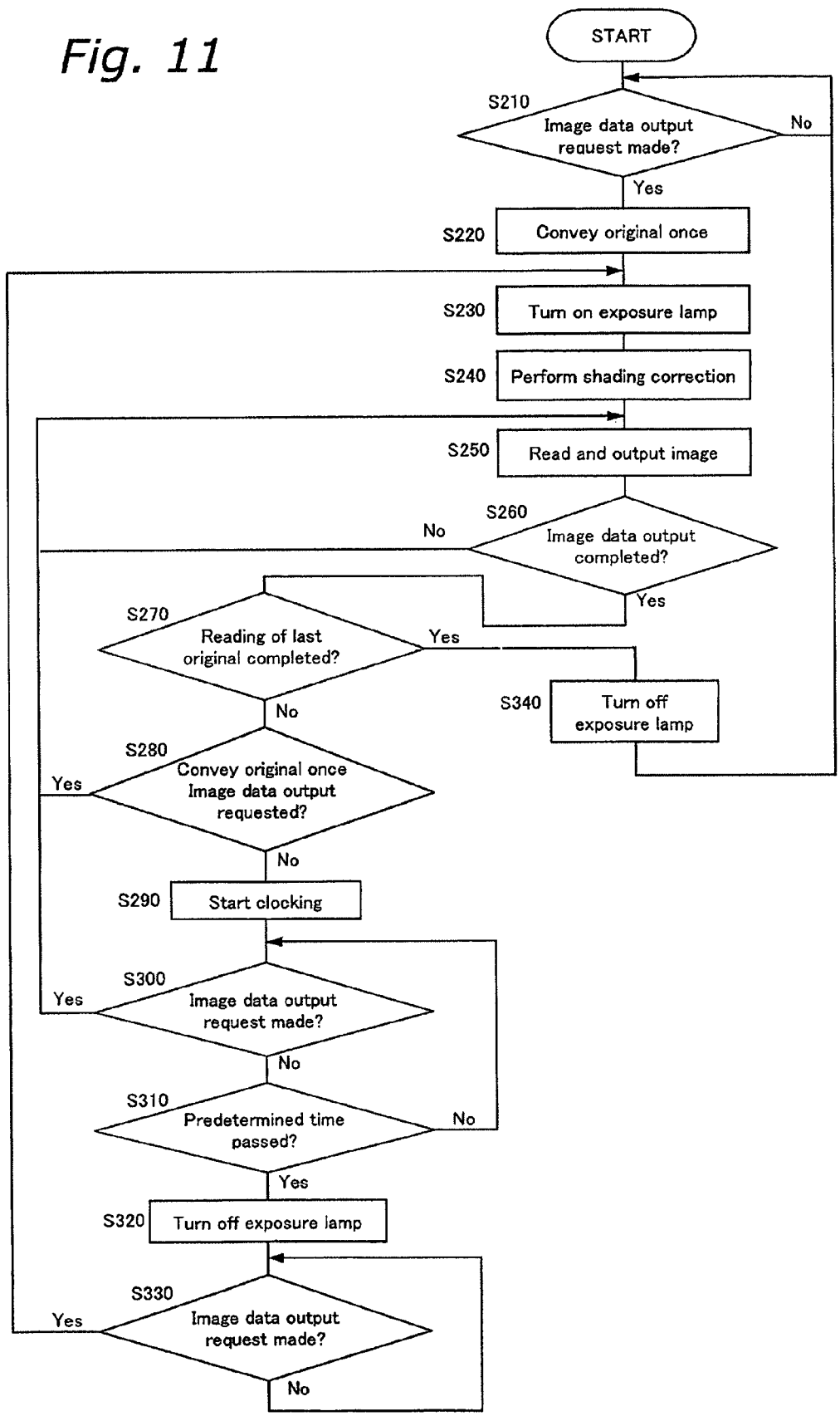
FIG. 11 is a flowchart showing another specific example of image reading procedures of the image reading device according to an embodiment of the present invention.

FIG. 11 is a flowchart showing another specific example of image reading procedures in the image reading device of this embodiment of the present invention.

Referring to FIG. 11, steps S210 to S260 are the same as steps S10 to S60. When the output of the image data has been completed in step S260, it will be confirmed whether the last original image has been read (step S270). If the last original image has been read, the exposure lamp 112 is turned off in step S340 and then it is determined whether an output request for image data for a new original has been made (step S210). Otherwise, if the last original image has not been read, the next original 116 is fed and it is confirmed whether the output request for the image data thereof has been made (step S280). Here, if the output request has already been made, the next original 116 is conveyed to the reading position B without stopping in step S250. When an output request is made in step S280, the next original 116 waits at the standby position A. Then, in step S290, the clocking means 15 is first reset and then started, and then the operation proceeds to step S300. If the output has not been completed in step S260, the confirmation is repeated until the next original 116 finishes passing through the reading position B.

Steps S300 to S330 are the same as steps S100 to S130.

In addition, the timing output requesting means 13 that outputs the image data is the same as described above. The predetermined period of time is also set as described above.

In the above image reading procedures, after the exposure lamp 112 is lit for the predetermined period of time starting from the point at which the next original is fed and begins to wait, the exposure lamp 112 will be temporarily turned off. Therefore, variation in light intensity caused by continuous lighting and an increase in cumulative lighting time of the exposure lamp 112 can be prevented, the read image is prevented from deteriorating and power is prevented from being wasted. In addition, because reference data is obtained for shading correction prior to the reading of the next original image, the influence of the above variations in light intensity can be further prevented.

Figure 12:
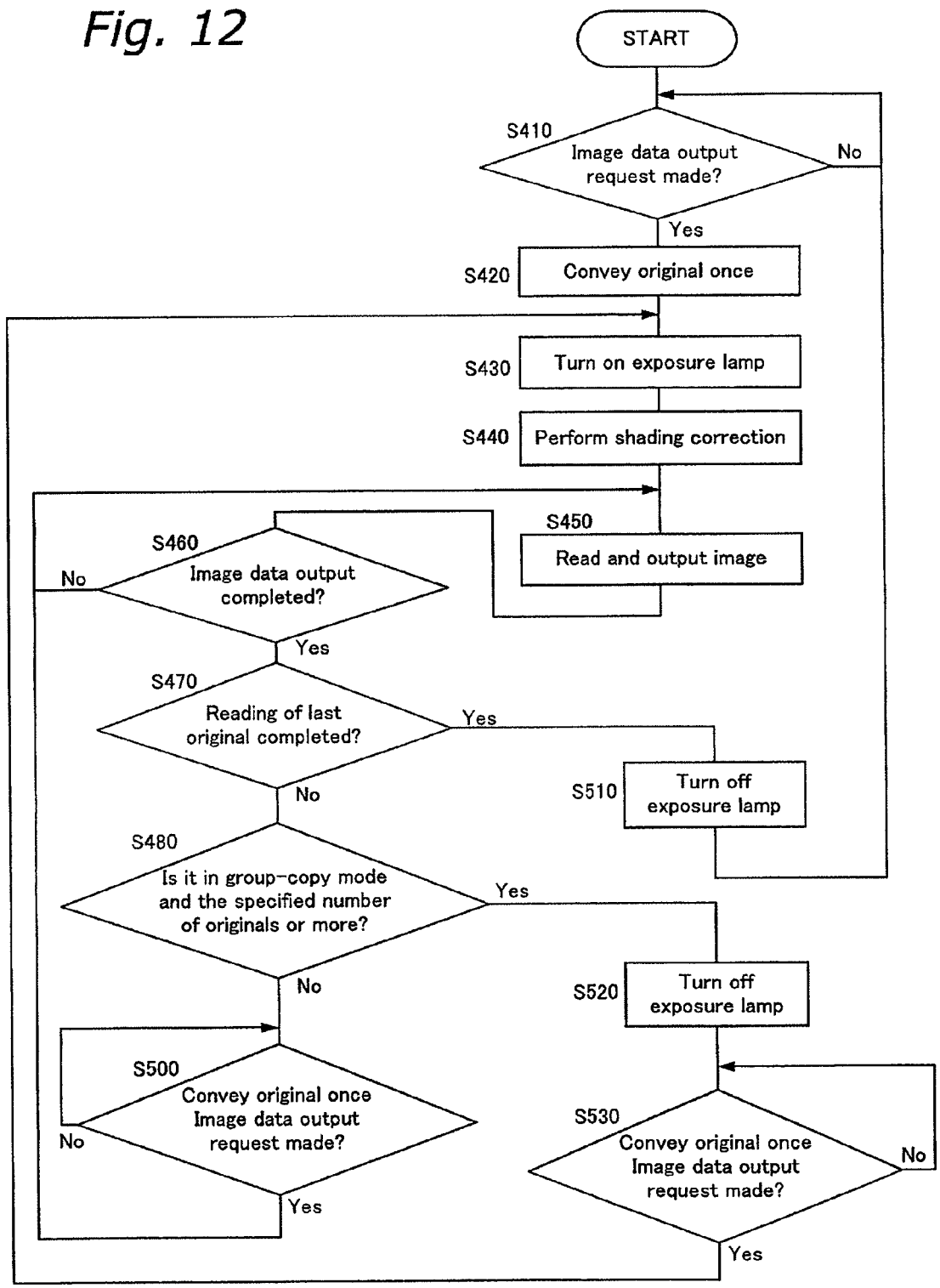
FIG. 12 is a flowchart showing a specific example of image reading procedures of an image reading device according to an embodiment of the present invention.

FIG. 12 is a flowchart showing a specific example of image reading procedures in an image reading device according to another embodiment of the present invention.

Referring to FIG. 12, steps S410 to S470 are the same as steps S210 to S270. If reading of the last original image has been completed in step S470, the exposure lamp 112 is turned off in step S510, and it is determined whether an output request for image data of a new original has been made (step 410). Otherwise, if reading of the last original image has not been completed, it is confirmed whether the printing device 3 is in the group-copy mode and whether the printed number of pages of each original is the predetermined number or greater in step S480. Here, when the printing device 3 is in the group-copy mode and the printed number of pages of an original is the predetermined number or greater, the exposure lamp 112 is turned off in step S520, and the next original is fed and waits at the standby position A until the output request for the image data has been made (step S530). Here, when the output request has been made, the exposure lamp is turned on in step S430, the reference data is again obtained for shading correction (step S440), and then image reading and outputting are performed (step S450).

If in step S480 the printing device 3 is not in the group-copy mode or the printed number of pages of an original is less than the predetermined number, the next original 116 is conveyed and waits until the output request for the image data is made by the output requesting means 13 (step S500). At this time, if the output request has already been made, the original 116 is conveyed to the reading position B without stopping (step S450). Otherwise, if the output request has not yet been made, the original 116 waits at the standby position A. Then, even if the output request for the image data has been made, the image reading and outputting operations are performed without obtaining reference data for shading correction in step S450 because the lighting time of the exposure lamp 112 is short.

Note that the timing at which the output requesting means 13 outputs the image data is the same as described above. In addition, the predetermined number of pages may be set such that the image data output to the storage device 4 is not increased, or deterioration of the printed image by the printing device 3 is not increased. More specifically, when preference is given to reading speed of the original in consideration of operational efficiency, the predetermined number of pages will be set to be large and when preference is given to the image quality of the printing, the predetermined number of pages will be set to be small. In either case, the production efficiency is improved compared with the case when the predetermined number of pages is not set.

As described above, in the image reading device according to another embodiment of the present invention, when the printed number of pages of each original is the predetermined number or greater in the group-copy mode, after the output of the image data to the storage device 4 is completed, the exposure lamp 112 is temporarily turned off. Therefore, variation in light intensity caused by continuous lighting and an increase in cumulative lighting time of the exposure lamp 112 can be controlled without lowering the production efficiency, the read image can be prevented from deteriorating and wasteful power consumption can be prevented. In addition, because the shading correction is performed prior to the reading of the next original image, the influence of the above variation in light intensity can be further prevented.

Figure 13:
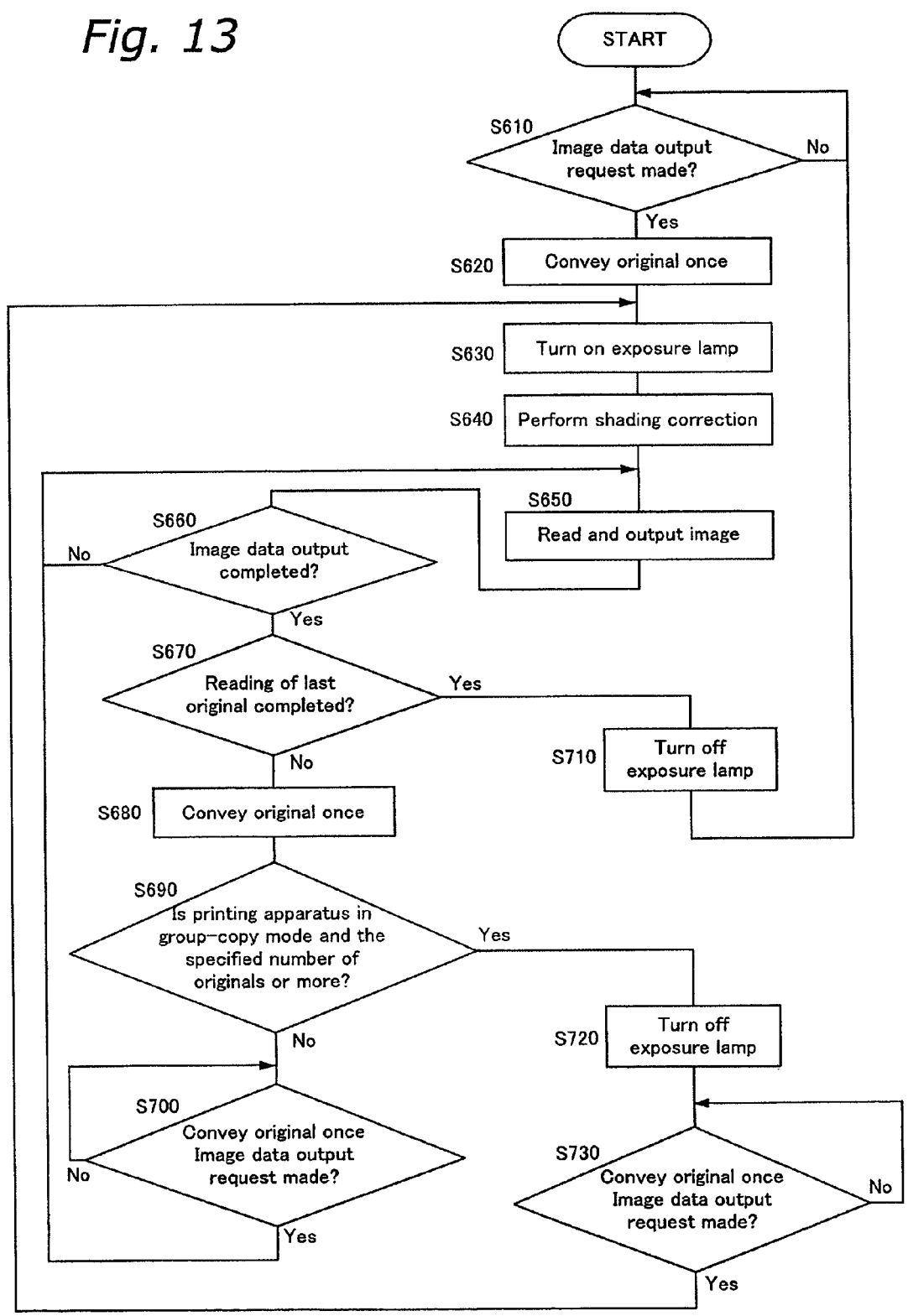
FIG. 13 is a flowchart showing another specific example of image reading procedures of the image reading device according to an embodiment of the present invention.

FIG. 13 is a flowchart showing another specific example of image reading procedures in an image reading device according to another embodiment of the present invention.

Referring to FIG. 13, steps S610 to S670 are the same as steps S410 to S470. If the reading of the last original image has been completed in step S670, the exposure lamp 112 is turned off (step S710) and it is determined whether an output request for image data of a new original has been made (step 610). Otherwise, if the reading of the last original image has not been completed, it is confirmed whether the printing device 3 is in the group-copy mode and the printed number of pages of each original is a predetermined number or greater (step S690). Here, when the printing device 3 is in the group-copy mode and the printed number of pages of each original is the predetermined number or greater, the exposure lamp 112 is turned off in step S720, and then the next original 116 is conveyed and waits at the standby position A until the output request for the image data is made (step S730). Here, when the output request is made, the exposure lamp is turned on in step S630, reference data for shading correction is again obtained (step S640), and then image reading and outputting are performed (step S650).

When the printing device 3 is not in the group-copy mode or the printed number of pages of each original is less than the predetermined number in step S690, the next original 116 is fed and waits until the output request for the image data has been made by the output requesting means 13 (step S700). At this time, if the output request has already been made, the original 116 is conveyed to the reading position B without stopping (step S650). Otherwise, if the output request has not yet been made, the original 116 waits at the standby position A. Then, even if the output request is made in step S700, the image reading and output operations are performed without obtaining reference data for shading correction in step S650 because the lighting time of the exposure lamp 112 is short.

Note that the timing at which the output requesting means 13 outputs the image data is the same as described above. In addition, the predetermined number of pages may be set as described above.

As described above, in the image reading device according to this embodiment of the present invention, if the printed number of pages of each original is the predetermined number or greater in the group-copy mode, when the next original is in the standby state for image reading, the exposure lamp 112 is temporarily turned off. Therefore, variation in light intensity caused by continuous lighting and increase in cumulative lighting time of the exposure lamp 112 can be controlled, the read image can be prevented from deteriorating, and wasteful power consumption can be prevented. In addition, because reference data for shading correction is obtained prior to the reading of the next original image, the influence of the above variation in light intensity can be further controlled.

In the image processing system of the present invention, the image data output from the output means 12 is stored in the storage means 4, stored image data is output to the printing device 3, and images are is printed in each embodiment of the image reading device 1.

In the image forming device of the present invention, image reading is performed with the same procedures as each of the image reading procedures of the above examples. More specifically, the original conveying means 20, the reading means 21, the output means 22, the output requesting means 23, the control means 24 and the clocking means 25 of the image forming device operate in the same manner as the original conveying means 10, the reading means 11, output means 12, the output requesting means 13, the control means 14 and the clocking means 15 in each of the aforementioned examples of the image reading procedures. In addition, in the image forming device of the present invention, image data output by the output means 22 is stored in the storage means 27, stored image data is output to the printing means 26 and images are printed. In addition, the printing means 26, charging means 260, exposing means 261, developing means 262, transferring means 263 and fixing means 264 operate in the same manner as the charging means 30, exposing means 31, developing means 32, transferring means 33 and fixing means 34.

In the image processing system and the image forming device of the present invention the same effects are provided as in each of the aforementioned specific examples.

In addition, the control of each determination and each process procedure shown in FIGS. 4 to 7 and 10 to 13 is performed by the control means 14 in the image reading device and the image processing system, and by the control means 24 in the image forming device.

In addition, although the original 116 is fed and waits at the standby position A for image reading in the embodiments of the image reading device, the image printing system and the image forming device, the standby position A may be any position provided that it is before the reading position B. In addition, the original 116 is not necessarily fed, and the original 116 can wait on the original tray 100.

Effects of the Invention

According to the image reading device of the present invention, in situations when it takes time for the image of the next original to be read, such as in the group-copy mode, toner empty, calling of the facsimile, connection confirmation to the server, the periodical adjustment mode of the image forming process and the like, variation in light intensity caused by continuous lighting of the exposure lamp can be prevented, the read image is prevented from deteriorating and wasteful power consumption is prevented, because the exposure lamp serving as a light source for reading of the original is turned off.

According to the image processing system and the image forming device of the present invention, similar to the image reading device, because the exposure lamp is turned off, variation in light intensity caused by continuous lighting time of the exposure lamp can be prevented, the read image is prevented from deteriorating to provide an appropriate printed image, transmission data, or registration data and wasteful power consumption is prevented.

Furthermore, according to the image reading device, the image processing system and the image forming device of the present invention, because the switching off of the exposure lamp is performed only when the printed number of pages of the original is the predetermined number or greater in the group-copy mode, variation in light intensity caused by continuous lighting time of the exposure lamp can be prevented without decreasing its production efficiency.

Furthermore, according to the image reading device, the image processing system and the image forming device of the present invention, because reference data is obtained for shading correction prior to the reading of the next original image, the influence of variation in light intensity can be further prevented.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An image reading device comprising;
an original conveyor being configured to convey an original from a predetermined original tray to a reading position in which an image of the original is read;
a reading unit reading the image of the original being conveyed by irradiation using an exposure lamp;
a controller allowing conveyance of the original to the reading position and switching on and switching off the exposure lamp; and
a clock starting to measure time when the original finishes passing through the reading position,
the controller switching off the exposure lamp when the reading unit continuously reads a plurality of originals, when one of the plurality of originals is at the reading position, and when a time measured by the clock reaches a predetermined time before conveyance of the next original to the reading position is allowed.

2. The image reading device according to claim 1, wherein when conveyance of the next original to the reading position is allowed by the controller then the controller switches on the exposure lamp if the exposure lamp is off and obtains reference data for shading correction prior to an output of the image data.

3. An image processing system comprising;
an image reading device according to claim 1;
a storage device in which image data of the original read by the reading unit are stored; and
a node processing the image data stored in the storage device.

4. An image reading device comprising;
an original conveyor being configured to convey an original from a predetermined original tray to a standby position, to hold temporarily the original at the standby position and then to convey the original to a reading position in which an image of the original is read;
a reading unit reading the image of the original being conveyed by irradiation using an exposure lamp;
a controller allowing conveyance of the original to the reading position and switching on and switching off the exposure lamp; and
a clock starting to measure time when the original reaches the standby position,
the controller switching off the exposure lamp when the reading unit continuously reads a plurality of originals, when one of the plurality of originals is at the reading position, and when a time measured by the clock reaches a predetermined time before conveyance of the next original to the reading position is allowed.

5. The image reading device according to claim 4, wherein when conveyance of the next original to the reading position is allowed by the controller then the controller switches on the exposure lamp if the exposure lamp is off and obtains reference data for shading correction prior to an output of the image data.

6. An image processing system comprising;
an image reading device according to claim 4;
a storage device in which image data of the original read by the reading unit are stored; and
a node processing the image data stored in the storage device.

7. An image forming device comprising;
an original being configured to convey an original from a predetermined original tray to a reading position in which an image of the original is read;
a reading unit reading the image of the original being conveyed by irradiation using an exposure lamp;
a controller allowing conveyance of the original to the reading position and switching on and switching off the exposure lamp;
a clock starting to measure time when the original finishes passing through the reading position;

a storage storing image data of the original read by the reading unit; and a processor processing the image data stored in the storage, the controller switching off the exposure lamp when the reading unit continuously reads a plurality of originals, when one of the plurality of originals is at the reading position, and when a time measured by the clock reaches a predetermined time before conveyance of the next original to the reading position is allowed.

8. The image forming device according to claim 7, wherein when conveyance of the next original to the reading position is allowed by the controller then the controller switches on the exposure lamp if the exposure lamp is off and obtains reference data for shading correction prior to an output of the image data.

9. An image forming device comprising:

an original conveyor being configured to convey an original from a predetermined original tray to a standby position, to hold temporarily the original at the standby position and then to convey the original to a reading position in which an image of the original is read;

a reading unit reading the image of the original being conveyed by irradiation using an exposure lamp;

a controller allowing conveyance of the original to the reading position and switching on and switching off the exposure lamp;

a clock starting to measure time when the original is conveyed to the standby position;

a storage storing image data of the original read by the reading unit; and a processor processing the image data stored in the storage, the controller switching off the exposure lamp when the reading unit continuously reads a plurality of originals, when one of the plurality of originals is at the reading position, and when a time measured by the clock reaches a predetermined time before conveyance of the next original to the reading position is allowed.

10. The image forming device according to claim 9, wherein when conveyance of the next original to the reading position is allowed by the controller then the controller switches on the exposure lamp if the exposure lamp is off and obtains reference data for shading correction prior to an output of the image data.

11. An image reading device comprising:

an original conveyor being configured to covey automatically an original from a predetermined original tray;

a reading unit reading an image of the original being conveyed by irradiation using an exposure lamp;

a controller switching on and switching off the exposure lamp;

an output unit outputting read image data to be stored in a storage device;

a clock starting to measure time when the output of the image data is completed; and an output requesting unit requesting the output of the image data, the controller switching off the exposure lamp when the reading unit continuously reads a plurality of originals, when one of the plurality of originals is at the reading position, and when a time measured by the clock reaches a predetermined time before an output of the image data of the next original is requested by the output requesting unit.

12. The image reading device according to claim 11, wherein when the output of the image data is requested by the output requesting unit, then the controller switches on the exposure lamp if the exposure lamp is off and obtains reference data for shading correction prior to the output of the image data.

13. An image processing system comprising;

an image reading device according to claim 11;

a storage device in which image data output from the image reading device is stored; and a node processing the image data stored in the storage device.

14. An image reading device comprising:

an original conveyor being configured to convey automatically an original from a predetermined original tray;

a reading unit reading an image of the original being conveyed by irradiation using an exposure lamp;

a controller switching on and switching off the exposure lamp;

an output unit outputting read image data to be stored in a storage device;

a clock starting to measure time when the original gets to a standby state so as to be read; and an output requesting unit requesting the output of the image data, the controller switching off the exposure lamp when the reading unit continuously reads a plurality of originals, when one of the plurality of originals is at the reading position, and when a time measured by the clock reaches a predetermined time before an output of the image data of the next original is requested by the output requesting unit.

15. The image reading device according to claim 14, wherein when the output of the image data is requested by the output requesting unit, then the the controller switches on the exposure lamp if the exposure lamp is off and obtains reference data for shading correction prior to the output of the image data.

16. An image processing system comprising;

an image reading device according to claim 14;

a storage device in which image data output from the image reading device is stored; and a node processing the image data stored in the storage device.

17. An image forming device comprising;

an original conveyor being configured to convey automatically an original from a predetermined original tray;

a reading unit reading the image of the original being conveyed by irradiation using an exposure lamp;

an output unit outputting read image data;

an output requesting unit requesting the output of the image data;

a controller switching on and switching off of the exposure lamp;

a clock starting to measure time when the output of the image data is completed;

a storage storing the image data output from the output unit; and a processor processing the image data stored in the storage, the controller switching off the exposure lamp when the reading unit continuously reads a plurality of originals, when one of the plurality of originals is at the reading position, and when a time measured by the clock reaches a predetermined time before an output of the image data of the next original is requested by the output requesting unit.

18. The image reading device according to claim 17, wherein
when the output of the image data is requested by the output requesting unit, then the controller switches on the exposure lamp if the exposure lamp is off and obtains reference data for shading correction prior to an output of the image data.

19. An image forming device comprising:
an original conveyor being configured to convey automatically an original from a predetermined original tray;
a reading unit reading the image of the original being conveyed by irradiation using an exposure lamp;
an output unit outputting read image data;
an output requesting unit requesting the output of the image data;
a controller switching on and switching off the exposure lamp;
a clock starting to measure time when the original gets to a standby state so as to be read;
a storage storing the image data output from the output unit; and
a processor processing the image data stored in the storage,
the controller switching off the exposure lamp when the reading unit continuously reads a plurality of originals, when one of the plurality of originals is at the reading position, and when a time measured by the clock reaches a predetermined time before an output of the image data of the next original is requested by the output requesting unit.

20. The image reading device according to claim 19, wherein
when the output of the image data is requested by the output requesting unit, then the controller switches on the exposure lamp if the exposure lamp is off and obtains reference data for shading correction prior to an output of the image data.

* * * * *